US009549628B2

United States Patent
Koufos et al.

(10) Patent No.: US 9,549,628 B2
(45) Date of Patent: Jan. 24, 2017

(54) CONTAINER OR UTENSIL SUPPORT STRUCTURE

(71) Applicants: Gena Koufos, Watertown, MA (US); Brandon Michael Robinson, Watertown, MA (US)

(72) Inventors: Gena Koufos, Watertown, MA (US); Brandon Michael Robinson, Watertown, MA (US)

(*) Notice: Subject to any disclaimer, the term of this patent is extended or adjusted under 35 U.S.C. 154(b) by 108 days.

(21) Appl. No.: 14/482,890

(22) Filed: Sep. 10, 2014

(65) Prior Publication Data

US 2016/0066727 A1 Mar. 10, 2016

(51) Int. Cl.
*A47G 23/02* (2006.01)
*A47G 19/06* (2006.01)
(Continued)

(52) U.S. Cl.
CPC .......... *A47G 23/0216* (2013.01); *A47G 19/06* (2013.01); *A47G 23/06* (2013.01); *B60N 3/10* (2013.01); *A47G 2400/10* (2013.01)

(58) Field of Classification Search
CPC A47G 23/02; A47G 23/0208; A47G 23/0216; A47G 23/0241; A47G 23/0225; A47G 23/0266; A47G 23/0641; A47G 19/06; A47G 19/02; A47G 19/04; B60N 3/102
(Continued)

(56) References Cited

U.S. PATENT DOCUMENTS 4,033,489 A * 7/1977 Fowler ............... A47G 23/0208
206/216
5,085,391 A 2/1992 Berger et al.
(Continued)

FOREIGN PATENT DOCUMENTS

KR 10-2010-0068338 6/2010
WO WO-90/13492 11/1990

OTHER PUBLICATIONS

Miksovsky, Chris. http://www.miksovsky.com/chris/product/DrinkPlate/DrinkPlate_FAQ.htm Sep. 2013. 4 pps.
(Continued)

*Primary Examiner* — Anthony Stashick
*Assistant Examiner* — Robert Poon
(74) *Attorney, Agent, or Firm* — Foley and Lardner LLP; James De Vellis

(57) ABSTRACT

A container support apparatus can include a base body having a first portion, a second portion, and a boundary region between the first and second portions. The apparatus can include a first straight lateral connector member and a second straight lateral connector member, each formed at least in part from the first portion of the base body. The apparatus can include a bottom support member disposed in a coplanar position with the first portion of the base body in an undeployed state. The first and second lateral connector members can undergo downward angular pitching in conjunction with the bottom support member undergoing simultaneous vertical translation and planar rotation relative to the second portion of the base body during transition from the undeployed state to a deployed state, and the bottom support member can maintain a parallel orientation relative to the second portion of the base body during this transition.

20 Claims, 25 Drawing Sheets

(51) Int. Cl.
*A47G 23/06* (2006.01)
*B60N 3/10* (2006.01)

(58) Field of Classification Search
USPC ......... 220/737–738, 574; 294/137, 141, 142, 294/144, 172
See application file for complete search history.

(56) References Cited

U.S. PATENT DOCUMENTS

| | | | |
|---|---|---|---|
| 5,292,028 | A | 3/1994 | Patterson et al. |
| 5,607,077 | A | 3/1997 | Torkelson |
| 5,695,052 | A | 12/1997 | Damato |
| 6,062,418 | A | 5/2000 | Rathjen |
| D433,283 | S | 11/2000 | Thomas |
| 6,230,882 | B1 | 5/2001 | Wischusen, III |
| 8,292,118 | B2 | 10/2012 | Ebesu |
| 8,739,503 | B2 | 6/2014 | Smith |
| 2004/0262482 | A1* | 12/2004 | Lim ...................... A47G 19/06 248/311.2 |
| 2009/0126149 | A1* | 5/2009 | Whittaker .......... B65D 81/3879 16/111.1 |
| 2009/0230083 | A1 | 9/2009 | Metcalfe et al. |
| 2012/0248124 | A1 | 10/2012 | Mitri et al. |
| 2013/0181000 | A1 | 7/2013 | Miksovsky et al. |

OTHER PUBLICATIONS

Pioneer Plastics, http://inventorspot.com/drinkplate. 2013. 4 pages.
International Search Report and Written Opinion for PCT Appl. Ser. No. PCT/US2015/048861 dated Dec. 18, 2015.

\* cited by examiner

CONTAINER OR UTENSIL SUPPORT STRUCTURE

BACKGROUND

Food and beverages a may be available at social gatherings, such as a barbeque, birthday celebration, holiday party or other gatherings where a group of people may be eating or drinking. These people may move from place to place during the social gathering bringing food or beverages with them.

SUMMARY

At least one aspect is directed to a container support apparatus such as a food or beverage container. The apparatus can include a base body having a first portion, a second portion, and a boundary region between the first portion and the second portion. The boundary region can have an inner perimeter proximate to the first portion of the base body and an outer perimeter proximate to the second portion of the base body. The apparatus can include a first straight lateral connector member. A majority of the first straight lateral connector member can be formed from the first portion of the base body and not from the boundary region. The apparatus can include a second straight lateral connector member. A majority of the second straight lateral connector member can be formed from the first portion of the base body and not from the boundary region. The first straight lateral connector member and the second straight lateral connector member can have a same length. The apparatus can include a bottom support member formed at least in part from the first portion of the base body. The first straight lateral connector member, the second straight lateral connector member, and the bottom support member can be disposed in a coplanar position with the first portion of the base body in an undeployed state. The first straight lateral connector member can connect the bottom support member with the second portion of the base body. The second straight lateral connector member can connect the bottom support member with the second portion of the base body. The first straight lateral connector member and the second straight lateral connector member can be configured to promote the simultaneous vertical translation and planar rotation of the bottom support member relative to the second portion of the base body during transition from an undeployed state to a deployed state, and the bottom support member can be configured to maintain a parallel orientation relative to the second portion of the base body during transition from an undeployed state to a deployed state.

At least one aspect is directed to a method. The method can include providing a food or beverage container support apparatus. The apparatus can include a base body having a first portion, a second portion, and a boundary region between the first portion and the second portion. The boundary region can have an inner perimeter proximate to the first portion of the base body and an outer perimeter proximate to the second portion of the base body. The apparatus can include a first straight lateral connector member. A majority of the first straight lateral connector member can be formed from the first portion of the base body and not from the boundary region. The apparatus can include a second straight lateral connector member. A majority of the second straight lateral connector member can be formed from the first portion of the base body and not from the boundary region. The first straight lateral connector member and the second straight lateral connector member can have a same length. The apparatus can include a bottom support member formed at least in part from the first portion of the base body. The first straight lateral connector member, the second straight lateral connector member, and the bottom support member can be disposed in a coplanar position with the first portion of the base body in an undeployed state. The first straight lateral connector member can connect the bottom support member with the second portion of the base body. The second straight lateral connector member can connect the bottom support member with the second portion of the base body. The first straight lateral connector member and the second straight lateral connector member can be configured to promote the simultaneous vertical translation and planar rotation of the bottom support member relative to the second portion of the base body during transition from the undeployed state to a deployed state, and the bottom support member can be configured to maintain a parallel orientation relative to the second portion of the base body during transition from an undeployed state to a deployed state.

In some implementations, the first straight lateral connector member and the second straight lateral connector member, span interior of the boundary region and interior of the projection of the base of an intended container in an undeployed state. The first straight lateral connector member and the second straight lateral connector member can span exterior of a disposed container in a deployed state. Linear fold lines, at one or each of the first end and the second end of each the first straight lateral connector member and the second straight lateral connector member, can incorporate pre-straining, scoring, or creasing to facilitate localized folding during transition from an undeployed state to a deployed state. The linear fold lines can redirect tensile forces reducing stress at locations of shear caused by a disposed container in a deployed state. The linear fold lines can be arranged to promote the formation of structures or configurations capable of distributing local forces or otherwise supporting compressive forces in a deployed state.

In some implementations, the food or beverage container support apparatus can include at least one tab. A majority of the tab can be formed from the first portion of the base body to stabilize or center a container of one of many different suitable shapes and diameters, in a deployed state. In some implementations, the container support apparatus includes a third lateral connector member, a majority of the third lateral connector member formed from the first portion of the base body and not from the boundary region and having the same length as the first straight lateral connector member and the second straight lateral connector member. The third lateral connector member can be straight and can span interior of the boundary region and interior of the projection of the base of an intended container in the undeployed state. The third lateral connector member can span exterior of a disposed container in a deployed state. Linear fold lines, at one or each of the first end and the second end of any of the lateral connector members can incorporate pre-straining, scoring, or creasing to facilitate localized folding during transition from the undeployed state to a deployed state. In some implementations, container support apparatus can include four lateral connector members. The inner and outer edges of each of the first straight lateral connector member, the second straight lateral connector member, the third straight lateral connector member, and the fourth straight lateral connector member, in the undeployed state, can be oriented symmetrically and superimposed upon portions of concentric squares. The third straight lateral connector member and the fourth straight lateral connector member can span interior of the boundary region and interior of the projection of the base of an intended container in the undeployed state. The third straight lateral connector member and the fourth straight lateral connector member can span exterior of a disposed container in a deployed state. The inner and outer edges of the lateral connector members, in the undeployed state, can be oriented symmetrically and superimposed upon portions of concentric regular polygons.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems for supporting at least a food or beverage container. The various concepts introduced above and discussed in greater detail below may be implemented in any of numerous ways, as the described concepts are not limited to any particular manner of implementation. Examples of specific implementations and applications are provided primarily for illustrative purposes.

Disposable, recyclable, or reusable plates can be distributed to attendees of social gatherings, such as a backyard barbeque or other event where food and beverages may be served to a group of people. At some of these events, be they indoor or outdoor, people may carry their plate and beverage with them as they move from location to location. When, for example, standing, it may be difficult for a person to carry various combinations of a plate that holds food, utensils, and a beverage in a can, cup, or bottle. In such examples a person's hands may be occupied with the plate and beverage container, making it difficult to do anything else with ones hands, such eat, drink, gesticulate, or shake hands.

In some implementations, a beverage container support apparatus can be formed entirely or substantially (e.g., >90%) from the material of a plate (or other object). For example, a series of perforations or cut-outs in a portion of the plate can deploy from an undeployed position (e.g., substantially parallel to or integrated with a surface of the plate) to a deployed position where the beverage container support apparatus protrudes down from a bottom surface of the plate to form an opening that can accommodate a can, cup, bottle, or other beverage container. The beverage container can be inserted into the opening and securely disposed in the container support apparatus. In this example, a person can hold a plate with one hand, leaving the other hand free to eat, socialize, or remove and replace the beverage container to or from the beverage container support apparatus of the plate. The plate can include food (e.g., in a first area on a top surface of the plate), and a beverage container inserted into the opening of the plate, e.g., in a second area of the plate.

Figure 1:
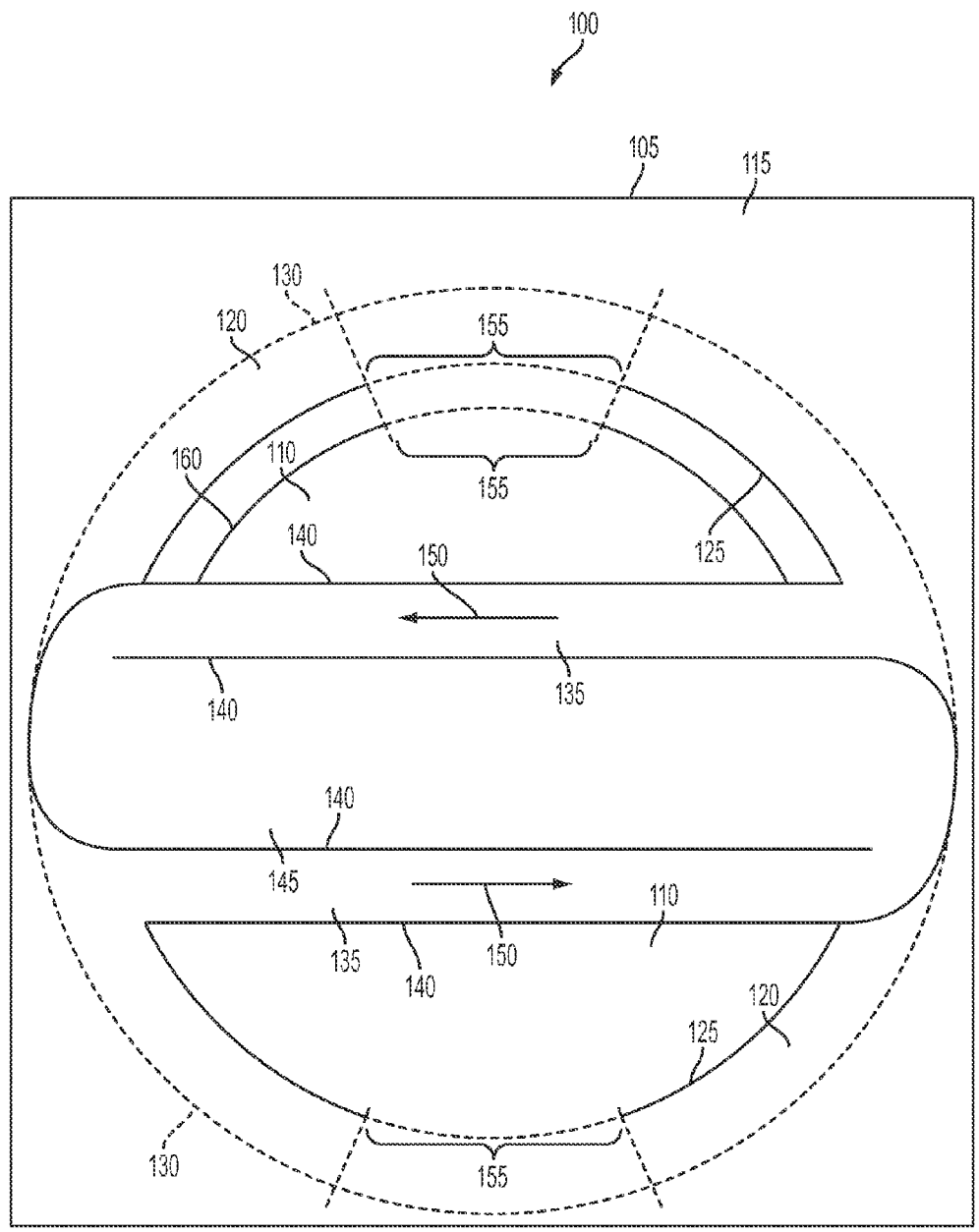
FIG. 1 is an illustration depicting one example of a portion of the apparatus in an undeployed state, according to an illustrative implementation.

FIG. 1 illustrates an example of a portion of the beverage container support apparatus 100 in an undeployed state. The apparatus 100 can be part of a plate or other food container. The plate can be a disposable or multi-use plate, formed from plastic, paper, cardboard, compressed paper, molded fiber, or combinations thereof. The apparatus 100 can include at least one base body 105, such as the base surface of a plate. The base body 105 can include a first portion 110 and a second portion 115. In some implementations, the first portion 110 of the base body 105 is configured at least in part for the placement of food. The second portion 115 of the base body 105 can include a region of the apparatus 100 configured at least in part for the placement of a food or beverage container with the apparatus 100 in a deployed state. There may or may not be a discernable boundary between the first portion 110 and the second portion 115 of the base body 105, indicated by a lip, boundary, or marking for example.

In some implementations, the second portion 115 of the base body 105 includes at least one opening (e.g., a slit or quadrilateral opening) for insertion of a fork, spoon, knife, skewer, utensil, or napkin. For example, at least one rim, lip, wall or raised edge of a square, rounded, circular, or elliptical plate can include one or more slots into which a user can removably slide or position a utensil or napkin. In this example, the utensil or napkin can be carried about with the plate, without a person holding the plate needing to separately hold or carry the utensil or napkin, or balance the utensil or napkin on the plate. For example, the apparatus 100 can be part of a 10 inch diameter round plate. Two lateral openings or slits in the plate 0.125 inch wide and 1.5 inches long can be formed along an elevated edge or rim of the plate, spaced 2.5 inches (+/−10%) from each other. A utensil or napkin can be disposed horizontally (e.g., when the plate is in use, holding food) in one or both openings to removable secure the utensil or napkin to the plate, generally disposed in parallel with the base body 105 of the plate, where food may sit.

The openings may also be top openings on the plate, e.g., with dimension of 0.875×0.25 inches, and a utensil can be disposed vertically (e.g., when the plate is in use, holding food) with part of the utensil hanging below the bottom surface of the plate. Angled slits (e.g., converging lines) can also be cut into part of a plate, extending inward from an outer rim of the plate. At the outer rim, the converging lines can be at their closest point to each other, e.g., 1.0 inches, and can diverge from each other as they extend into the plate, terminating when they are 1.5 inches apart. The tab formed by these slits can be raised for the insertion of a napkin, and pinching forces can hold the napkin in place, secured by the tab.

The base body 105 can include at least one boundary region 120. The boundary region 120 can be a portion of the base body 105 that is between the first portion 110 and the second portion 115. The boundary region 120 can include at least one inner perimeter 125 and at least one outer perimeter 130. The inner perimeter 125 of the boundary region 120 can define a boundary or border between the boundary region 120 and the first portion 110 of the base body 105. The outer perimeter 130 of the boundary region 120 can define a boundary or border between the boundary region 120 and the second portion 115 of the base body 105. An opening to accommodate a food or beverage container can be formed primarily from material of the first portion 110 of the base body 105, with connections to the second portion 115 of the base body 105 occurring in or adjacent to the boundary region 120.

The base body 105 can include at least one lateral connector member 135. A majority of the material forming the lateral connector members 135 can come from the first portion 110 of the base body 105, rather than from the boundary region 120 or from the second portion 115. In some implementations, a majority of the material that forms the lateral connector members 135 is the material of the first portion 110 of the base body, with a portion of the lateral connector members 135 formed from material of the boundary region 120, and none of the lateral connector member 135 formed from material of the second portion 115. The lateral connector members 135 can be straight. For example, longitudinal edges 140 of the lateral connector members 135 can be parallel, so that the lateral connector members 135 are straight, where an angular differential of within +/−10% from pure parallel can still be considered parallel. In some implementations, the angular differential of the straight later connector members 135 is less than +/−2%. At least one lateral connector member 135 may be considered straight where a chord, beginning anywhere along the width and extending the length of the long axis of the lateral connector member, remains within the outline of the lateral connector member. The lateral connector members 135 can also be formed exclusively from material of the first portion 110 of the base body 105, and not from any material of the boundary region 120 or the second portion 115 of the base body 105. The straight lateral connector members 135 of the apparatus 100 can form at least part of the perimeter of, or be in the footprint of, a regular polygon. The majority of the material that makes up the straight lateral connector members 135 can be material from inside the diameter of the inner perimeter 125 or from inside the diameter of the outer perimeter 130.

The base body 105 can include at least one bottom support member 145. The bottom support member 145 can be formed at least in part from the material of the first portion 110 of the base body 105. In some implementations, a majority of the bottom support member 145 is formed from material of the first portion 110 of the base body, with a portion of the bottom support member 145 formed from material of the boundary region 120, and none of the bottom support member 145 formed from material of the second portion 115. The bottom support member 145 can also be formed exclusively from material of the first portion 110 of the base body 105. The inner perimeter 125 and the outer perimeter 130 may or may not be marked e.g., by a line or change in contour of the base body 105. For example the inner perimeter 125 of the boundary region 120 can define an opening for the largest container (measured radially) that the apparatus is designed to accommodate, and the outer perimeter 130 can be defined by an unmarked circle formed when connecting endpoints of multiple lateral connector members 135. In some implementations the inner perimeter 125 and the outer perimeter 130 can overlay each other. The inner perimeter 125 of the boundary region 120 can be defined by an unmarked circle formed when connecting inner endpoints of multiple lateral connector members 135.

The beverage container support apparatus 100 can be disposed in an undeployed state, as in FIG. 1, among others. In the undeployed state, there is no existing opening for insertion of a beverage (or other type of) container. In an undepolyed state, the bottom support member 145 can be disposed in a coplanar position with the base body 105 and other elements of the apparatus 100 such as the first portion 110, the second portion 115, the boundary region 120, and the lateral connector members 135. For example, these elements can be part of, cut from, formed from, connected with, or integrated into the base body 105, so that the surface of the base body is flat. In this example, a plurality of plates having these elements is stackable with the container support apparatus 100 in the undeployed state, and can occupy a similar footprint as stacked plates that do not include the apparatus 100.

Figure 2:
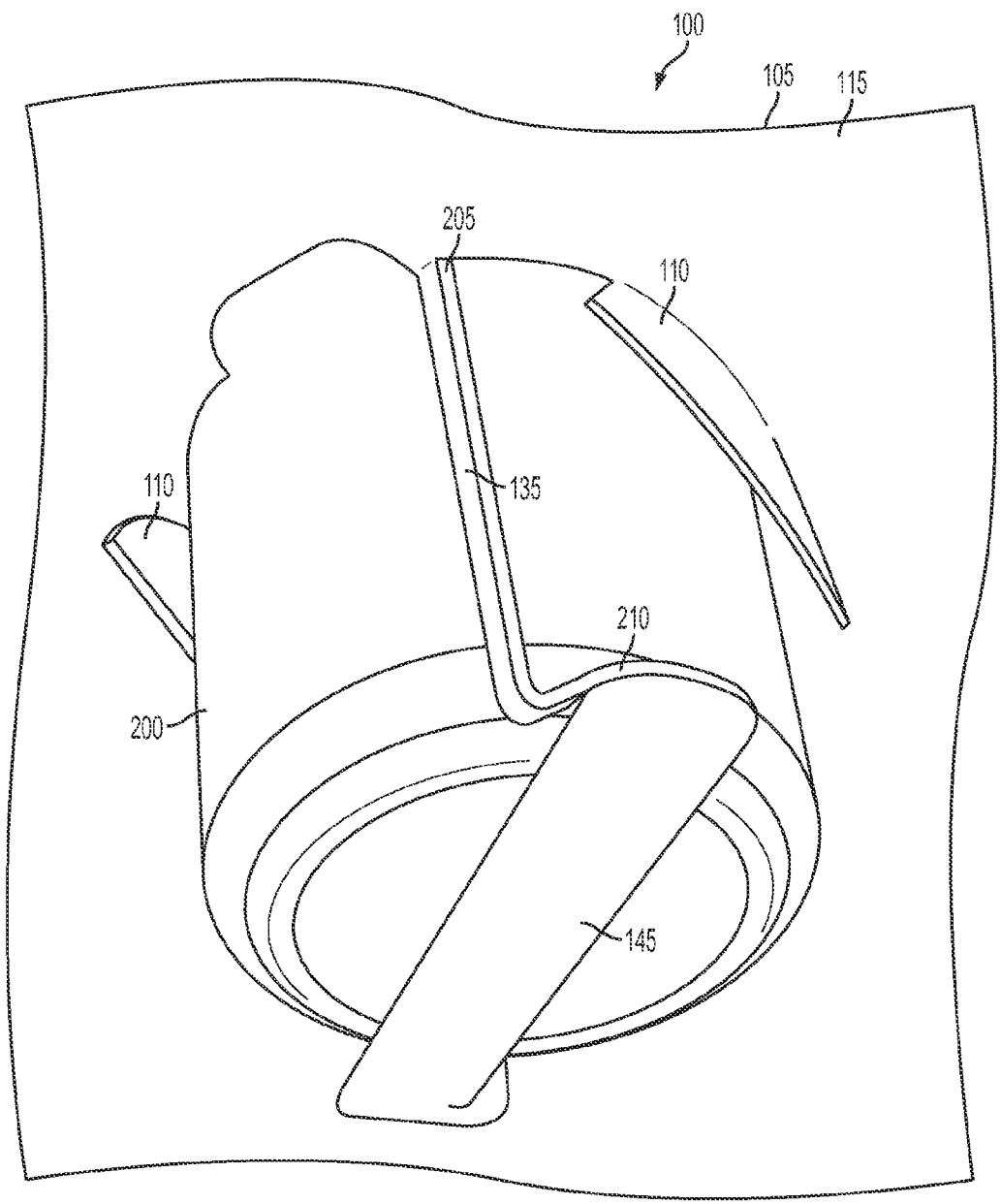
FIG. 2 is a perspective view depicting one example of a portion of the apparatus in a deployed state and accommodating a beverage container, according to an illustrative implementation.

FIG. 2 depicts an example bottom perspective view of a portion of the container support apparatus 100 in a deployed state and accommodating a beverage container 200, according to an illustrative implementation. The elements of the beverage container support apparatus 100 can be perforated or cut out from the material of the base body 105 to protrude downward responsive to contact force or pressure (e.g., protruding from the bottom of the plate, where food can be disposed on the top of the plate) to deploy the support apparatus 100 from the undeployed state, e.g., as in FIG. 1 to a deployed state, e.g., as in FIG. 2. In the deployed state, the beverage container support apparatus 100 defines an opening for placement or support of a beverage container 200 such as a can, cup, or bottle. The base body 105 can include (e.g., be) at least part of a plate. The first portion 110 of the base body 105 can support the beverage container 200 when the apparatus 100 is in a deployed state, and the second portion 115 of the base body 105 can support the food when the apparatus 100 is in the undeployed state. One or more beverage containers 200 can be repeatedly inserted or removed into the opening with the apparatus 100 in the deployed state. The beverage container 200 can include 6-24 ounce bottles, cans, or cups for example. At least part of the beverage (or other type of) container 200 can have a diameter of between 2.0 and 3.5 inches, for example.

The lateral connector members 135 can include a first end 205 to connect the lateral connector member 135 with the second portion 115 of the base body 105, and a second end 210 to connect the lateral connector member 135 with the bottom support member 145. The first end 205 and the second end 210 can each support two or three rotational degrees of freedom. At least some of the first portion 110 of the base body 105 can protrude downward in a deployed state, or move from a first position in an undeployed state to a second position in a deployed state, forming at least one tab 405. At least a portion of one or more tabs 405 (e.g., all or part of the first portion 110 of the base body 105 between a portion of the inner perimeter 125 and a longitudinal edge 140 of at least one lateral connector member 135) can contact the beverage container 200 when disposed in the opening of the container support apparatus 100. The tab can be cut from material of the base body 105, with a connection region 155 attaching the tab 405 (e.g., part of the first portion 110) with the second portion 115 via the boundary region 120. The length of the connection region can vary among lengths sufficient to allow the tab to move downward during transition from the undeployed to a deployed state and contact the beverage container 200. In one implementation, the length of the connection region 155 is at least 0.5 inches.

For example, the connection region 155 can have a length of 0.5 inches, or ⅝ of an inch. Contact force or pressure between the tab in the deployed state and the beverage container 200 can stabilize the beverage container 200. In one implementation, the container support apparatus 100 has two lateral connector members 135 and two tabs 405 formed from portions of the first portion 110 of the base body 105. Contact force or pressure between the tabs 405 and the beverage container 200 can stabilize the beverage container when disposed in the support apparatus 100 in the deployed state.

To transition from the undeployed state (as, for example, in FIG. 1) to the deployed state (as, for example in FIG. 2), the connectors members 135 can separate from the base body 105 along a majority of the longitudinal edges 140 to protrude downward from the base body 105 or from a plane defined by at least part of the second portion 115 of the base body 105. In some implementations, at least some of the base body 105 or the first portion 110 (e.g., part of a bottom side of a plate) can include a sticker, adhesive, laminate, polyethylene coating, wax, coating, other coating, removable weave or cord. This sticker, adhesive, or coating can cover or seal incomplete cuts, perforations, cuts, or slits in parts of the base body 105 that define elements of the apparatus 100, such as the lateral connector members 135, tabs 405 with the apparatus 100 in the undeployed state, and can be removed manually in order to allow transition of the apparatus 100 between undeployed and deployed states. The seal can prevent food or liquid from leaking through the perforations or slits. The transition between states can be reversible. For example, the apparatus 100 in the deployed state can collapse back, responsive to the application of force, to the undeployed state where, for example, the plate including the apparatus 100 can be stacked for storage and re-use.

For example, during deployment or transition from the undeployed state to the deployed state, the bottom support member 145 can undergo simultaneous vertical translation and planar rotation relative to the second portion 115 of the base body 105, and the lateral connector members 135 can pitch downward. For example, to undergo vertical translation, the lateral connector members 135 can pitch downward to a configuration substantially perpendicular (e.g., +/−20%) to a plane defined by at least part of the second portion 115, as in the example of FIG. 1 and FIG. 2, among others. In one implementation, to undergo vertical translation, the lateral connector members 135 drop down to a configuration perpendicular (e.g., +/−2%) or substantially perpendicular (e.g., +/−10%) to a plane defined by at least part of the second portion 115. The amount of vertical translation can be the same as (e.g., +/−2%) or within 10% of the length of the lateral connector members 135.

The translation or separation of components can include parallel planar rotation of the bottom support member 145 relative to a plane defined by at least part of the second portion 115, as in the example of FIG. 1 and FIG. 2, among others. For example, during transition to a deployed state, the lateral connector members 135 can pitch downward and the bottom support member 145 can rotate (e.g. clockwise as indicated by the direction indicator arrows 150 of FIG. 1) to undergo planar rotation relative to at least some of the second portion 115 of the base body 105. During the planar rotation or transition between undeployed and deployed states, the bottom support member 145 can maintain a parallel orientation relative to at least a portion of the second portion 115 of the base body 105. For example, a plane defined by the bottom support member 145 and a plane defined by at least part of the second portion 115 can be within +/−10% of a pure parallel configuration and be considered to be in a parallel orientation relative to each other during transition between undeployed and deployed states. In some implementations, the plane defined by the bottom support member 145 and the plane defined by at least part of the second portion 115 are within +/−5% of a pure parallel configuration and are considered to be in a parallel orientation relative to each other during transition between undeployed and deployed states. In the deployed state, the bottom support member 145 can be disposed in the parallel orientation relative to at least a portion of the second portion 115 of the base body 105. In this example, the bottom support member 145 can be generally flat in the deployed state, to support the bottom surface of the beverage container 200. The force that causes transition from the undeployed state to the deployed state can be applied by insertion of the beverage container 200, or manually applied prior to insertion of the beverage container 200.

The opening into which the beverage container 200 can be inserted when the beverage container support apparatus 100 is in a deployed state can be defined by the boundary region 120. For example, the opening can occur in or adjacent to the boundary region (e.g., along the inner perimeter 125 or the outer perimeter 130). At least some of the edge of the opening (e.g., along at least part of the inner perimeter 125) can contact an outer surface of the beverage container 200. The contact force can stabilize the beverage container 200 when deployed in the opening of the beverage container support apparatus 100.

The apparatus 100 can include reinforcement material, e.g., paper, plastic, laminate, or adhesive, applied to a bottom surface of the first portion 110 of the base body 105, parts of the second portion 115 of the base body 105, or the boundary region 120. The reinforcement material can prevent tearing between elements formed at least in part from the first portion 110 or the boundary region 120, such as between the lateral connector members 135 and the second portion 115 of the base body, or between the lateral connector members 135 and the bottom support member 145. The reinforcement material can also be applied to individual elements of the apparatus 100 to prevent those elements from failing under the weight of the beverage container 200, such as the lateral connector members 135 or the bottom support member 145. The reinforcement material can be applied prior to stamping, punching, cutting, perforating, or otherwise forming the elements of the apparatus 100, such as the lateral connector members 135 or the bottom support member 145.

Figure 3:
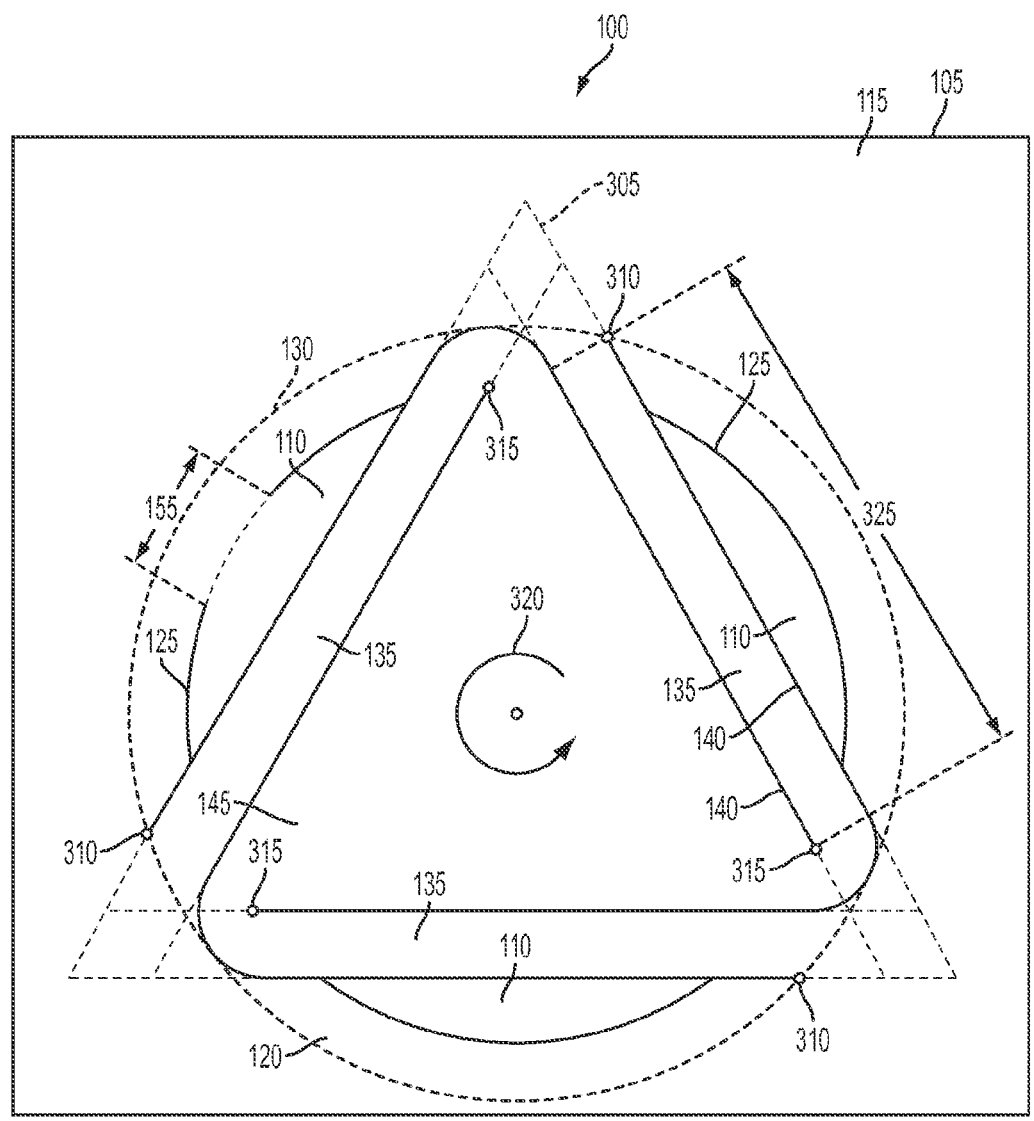
FIG. 3 is an illustration depicting one example of a portion of the apparatus in an undeployed state, according to an illustrative implementation.

FIG. 3 illustrates an example of a portion of the beverage container support apparatus 100 in an undeployed state. FIG. 3, among others such as FIGS. 4-13, 18-25, depicts three lateral connector members 135. The lateral connector members 135 can be straight, (e.g., at least part of the longitudinal edges of each of the lateral connector members 135 can be parallel, excluding deviations for fins or other functional or aesthetic characteristics). The lateral connector members 135 can be formed from at least part of the first portion 110 of the base body 105. For example, the lateral connector members 135 and the bottom support member 145 can be formed in their majority from material of the first portion 110 of the base body 105.

In some implementations, the beverage container support apparatus 100 includes three lateral connector members 135. For example, three lateral connector members 135 can be formed at least in part from the first portion 110 of the base body 105. Each of the three lateral connector members 135 can have a same (e.g., +/−10%) length. The three lateral connector members 135 can pitch angularly downward causing the bottom support member 145 to undergo simultaneous vertical translation and planar rotation relative to the second portion 115 of the base body 105 during transition from an undeployed state (e.g., as in FIG. 3) to a deployed state that defines an opening for the beverage container 200. This transition may occur during or prior to entry of the beverage container 200 into the opening of the apparatus 100.

The three lateral connector members 135 can be arranged as an equilateral triangle 305 in the undeployed state, as in FIG. 3. For example, the three lateral connector members 135 do not form a complete equilateral triangle 305 (e.g., depicted in part in phantom in FIG. 3), but rather are disposed in the footprint of the equilateral triangle 305, with each lateral connector member 135 forming part of one side of the equilateral triangle 305. The equilateral triangle 305 need not be marked on the apparatus 100. In some implementations cutting or perforating the lateral connector members 135 arranged as in FIG. 3, among others, in the footprint of the equilateral triangle 305 gives the lateral connector members 135 the structural configuration to pitch angularly downward and cause the vertical translation and planar rotation (e.g., in direction of rotation 320) of the bottom support member 145 and to form in part the opening for a container 200 during transition from an undeployed state to the deployed state. In some embodiments, the rotation in direction 320, or the mirror image of such embodiments rotating in the direction opposite 320, enables the angular displacement, via pitching and rotation, of the lateral connector members 135 and the rotation and vertical translation of the bottom support member 145 relative to the second portion 115 of the base body 105.

In some implementations, each of the three (or other number, e.g., two or four) lateral connector members 135 have a same (e.g., +/−10%) length. Referring to FIG. 3, for example, each lateral connector member 135 can have a first end 310 and a second end 315. The first end 310 can connect the lateral connector member 135 with the second portion 115 of the base body 105. The second end 315 can connect the lateral connector member 135 with the bottom support member 145. The first ends 310 of the lateral connector members 135 can be located at the outer perimeter 130. In some implementations, the first ends 310 of the lateral connector members 135 are disposed (e.g., located) at a symmetric vertex of an equilateral triangle, e.g., each of the three first ends 310 can be a vertex point of a first equilateral triangle. The second ends 315 of the lateral connector members can be disposed or located at a symmetric vertex of a second equilateral triangle. The second equilateral triangle can be concentric with the first equilateral triangle. The length 325 of the two, three, four, or other number of lateral connector members 135 can vary. For example, the lateral connector members can be at least 1.5 inches in length. In some implementations, the length 325 of the two, three, four, or other number of lateral connector members 135 is 2.0 inches, (e.g., +/−10%). The lateral connectors 135 can have a width of, for example, ⅜ of an inch, (+/−10%), or another width such as at least 0.25 inches. In some implementations, each lateral connector member 135 is of a same length and originates and terminates symmetrically at or near geometrically similar points of concentric polygons, as viewed for example in the undeployed state.

Figure 4:
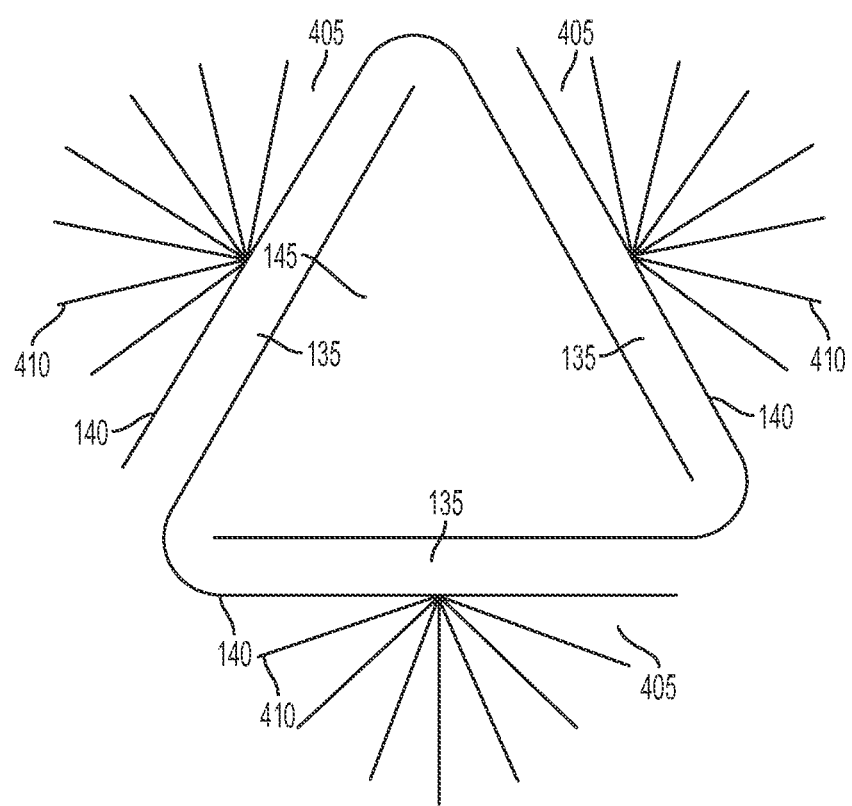
FIG. 4 is an illustration depicting one example of a portion of the apparatus in an undeployed state, according to an illustrative implementation.
Figure 5:
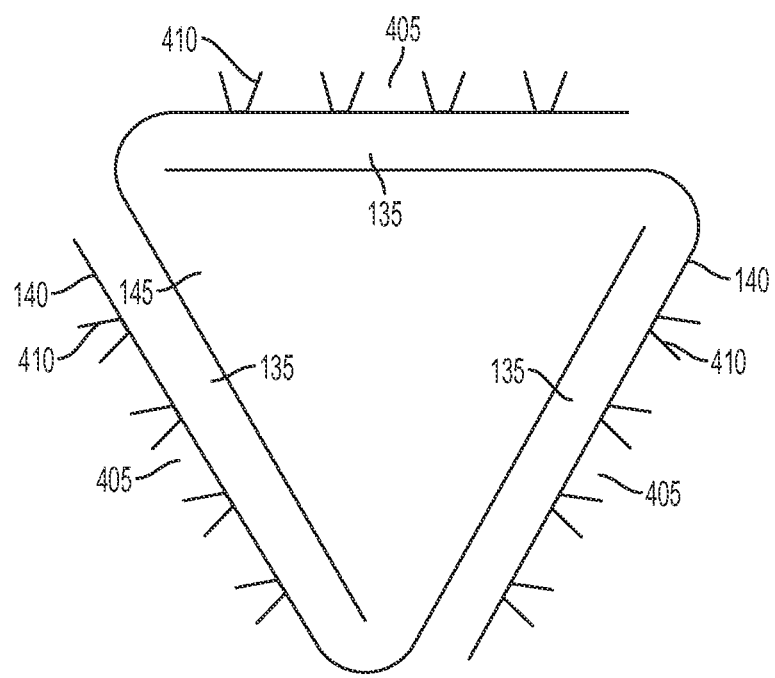
FIG. 5 is an illustration depicting one example of a portion of the apparatus in an undeployed state, according to an illustrative implementation.
Figure 6:
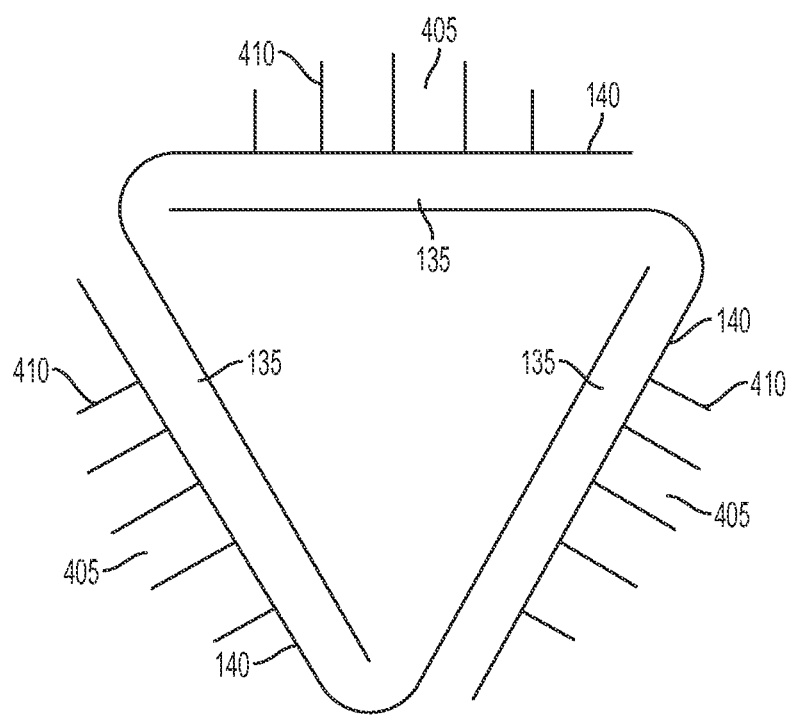
FIG. 6 is an illustration depicting one example of a portion of the apparatus in an undeployed state, according to an illustrative implementation.

FIG. 4, FIG. 5, and FIG. 6 depict example portions of the apparatus 100 in an undeployed state where a part of the first portion 110 of the base body 105 includes at least one tab 405. The tab 405 can be formed from the first portion 110 of the base body 105. The tabs can also be made from portions of boundary region 120 or the first portion 110 of the base body 105. To create the tab, a plurality of slots, cuts, or perforations 410 can be made from the first portion 110 or within the boundary region 120. The slits or perforations 410 can be arranged in a feathered configuration (e.g., FIG. 4), a toothed configuration (e.g., FIG. 5), a picket configuration (e.g., FIG. 6), a configuration of concentric arcs (e.g., FIG. 1), or combinations thereof to include patterns with slits of crossing radial, arcing, skew, or parallel lines. The perforations 410 can extend or arc out from an outer longitudinal edge 140 of at least one of the lateral connector members 135. The perforations 410 can support or hold in place the beverage container 200 when inserted in an opening of the apparatus 100 in the deployed state. The tab 405 can pivot from a first position in the undeployed state to a second position in a deployed state. In a deployed state, the tabs 405 can exert a spring or compression force on the lateral walls of the beverage container 200, or can stabilize the beverage container 200 without exerting a spring or compression force based on contact between the tabs 405 and the beverage container. The tabs 405 can be formed from material from within the outer perimeter 130 and the inner perimeter 125, or from material within the inner perimeter 125 alone, and can be located inside our outside at least one of the lateral connector members, relative to a center point of the circle formed by the inner perimeter 125 or the outer perimeter 130.

The tabs 405, or any other tabs, can be cut from the material of the first portion 110 of the base body 105, to stabilize various sizes of the beverage containers 200, such as 6-12 ounce bottles or cans, 20 ounce plastic bottles or cups with tapered sidewalls. The tabs 405 can be arranged in a variety of designs for specific or varying dimensioned beverage containers 200 so that multiple different types of beverage containers 200 can be accommodated in a single apparatus 100. The lateral connector members 135 spanning interior to the circumference of the beverage container 200, in an undeployed state, can provide excess material of the base body 105 (e.g., the first portion 110) that can form the tabs 405 to stabilize the beverage container 200. In the deployed state, the lateral connector members 135 extend exterior to the circumference of the beverage container 200. Referring for example to FIG. 1, among others, in some implementations, perforations can be formed in the first portion 110 of the base body 105 as one or more arcs 160, concentric for example with the inner perimeter 125. None, exactly one, or more than one cut or perforated arc per first portion 110; and a cut or perforated arc along portions of the inner boundary 125 can allow separation of a multitude of concentric slivers in a deployed state, based for example on the size (e.g., diameter) of the beverage container 200 being inserted, to form a custom tab for that beverage container 200.

Figure 7:
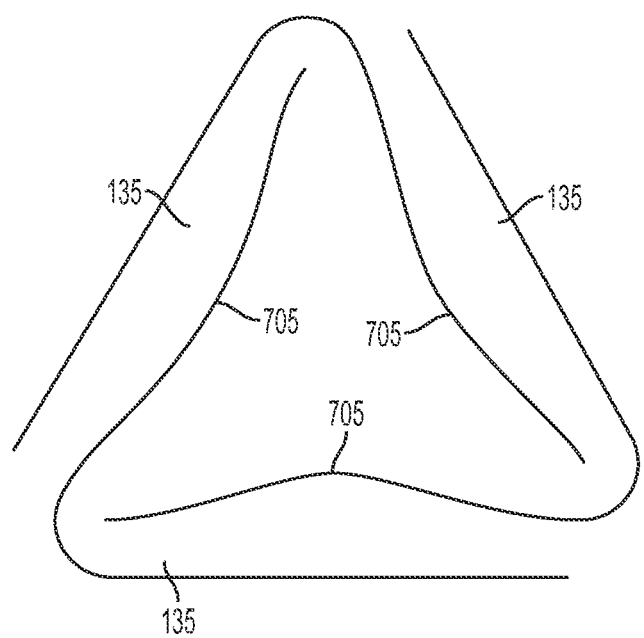
FIG. 7 is an illustration depicting one example of a portion of the apparatus in an undeployed state, according to an illustrative implementation.

FIG. 7 depicts an example portion of the apparatus 100 in the undeployed state with each of the three (or other number of) lateral connector members 135 having at least one fin 705. For example, rather than being a straight cut or perforation, the inner longitudinal edge 140 can be cut in a undulating, wave, serpentine, or curved pattern to form at least one fin 705. In the deployed state, the fin 705 can contact the outer surface of the beverage container 200 disposed in an opening of the apparatus 100. Contact force between the fin 705 and the beverage container 200 can stabilize or support the beverage container when the apparatus 100 is in the deployed state. In some implementations, at least one lateral connector member 135 includes at least one fin 705.

Figure 8:
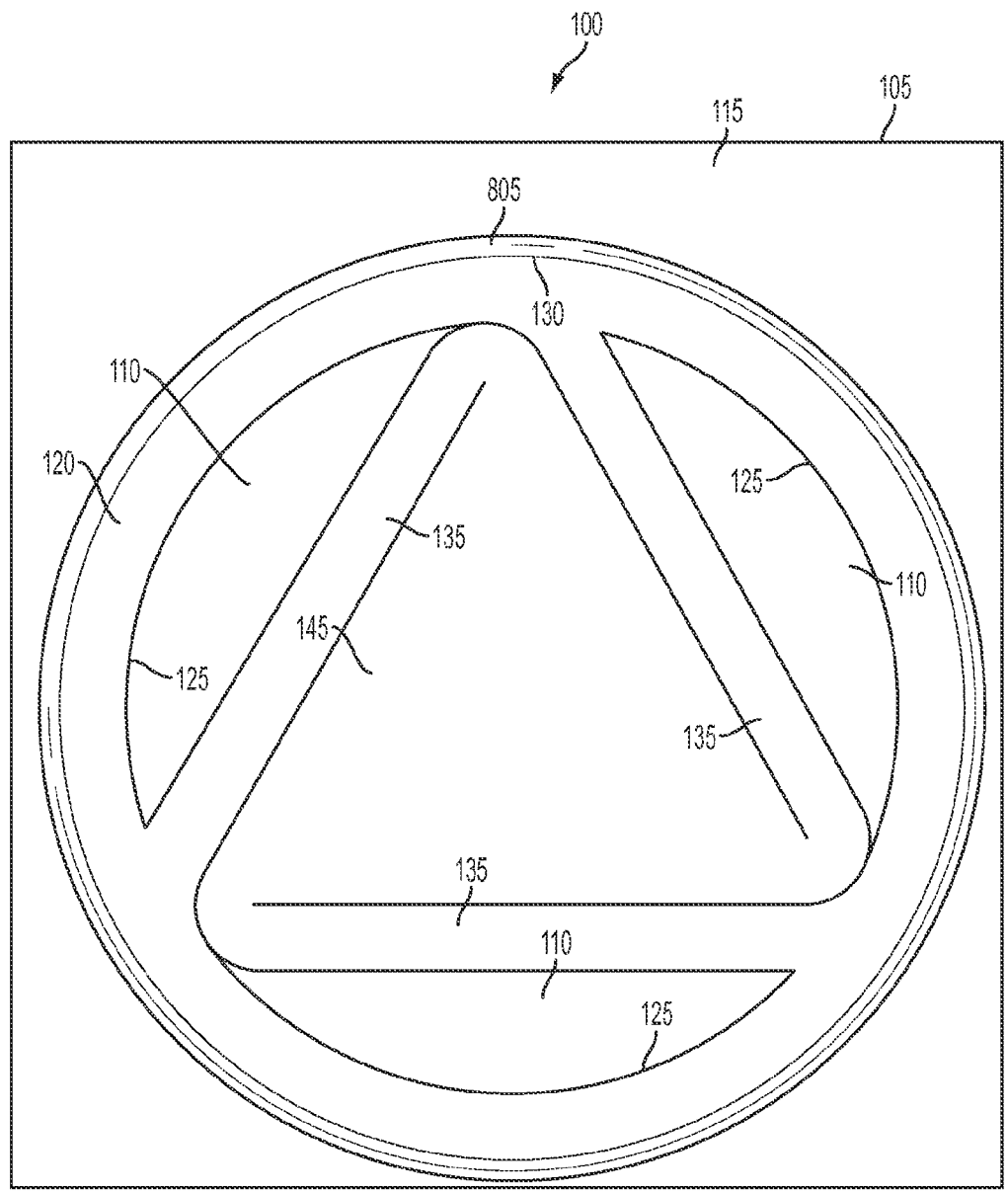
FIG. 8 is an illustration depicting one example of a portion of the apparatus in an undeployed state, according to an illustrative implementation.

FIG. 8 depicts an example portion of the apparatus 100 in an undeployed state. In some implementations, the lateral connector members 135 are formed (e.g., via cuts or perforations) exclusively from the material of the first portion 110 of the base body 105, as in the example of FIG. 8, among others. In this example, the three (or other number) of lateral connector members 135 are formed from material inside the inner perimeter 125 of the boundary region 120, and are not formed from material of the boundary region 120, and are not formed from material of the second portion 115 of the base body 105. The apparatus can include at least one lip 805. The lip 805 can include an elevated portion of the base body 105, relative to the base body 105, which separates the first portion 110 or the boundary region 120 from the second portion 115 of the base body 105. For example, the lip 805, or the boundary region 120 can be raised or elevated between ⅛ and ⅜ of an inch, relative to a surface of the base body 105, such as part of the second portion 115 where food can be disposed. The lip 805 can prevent food from running or falling into the area of the opening where the beverage container 200 can be inserted.

Figure 9:
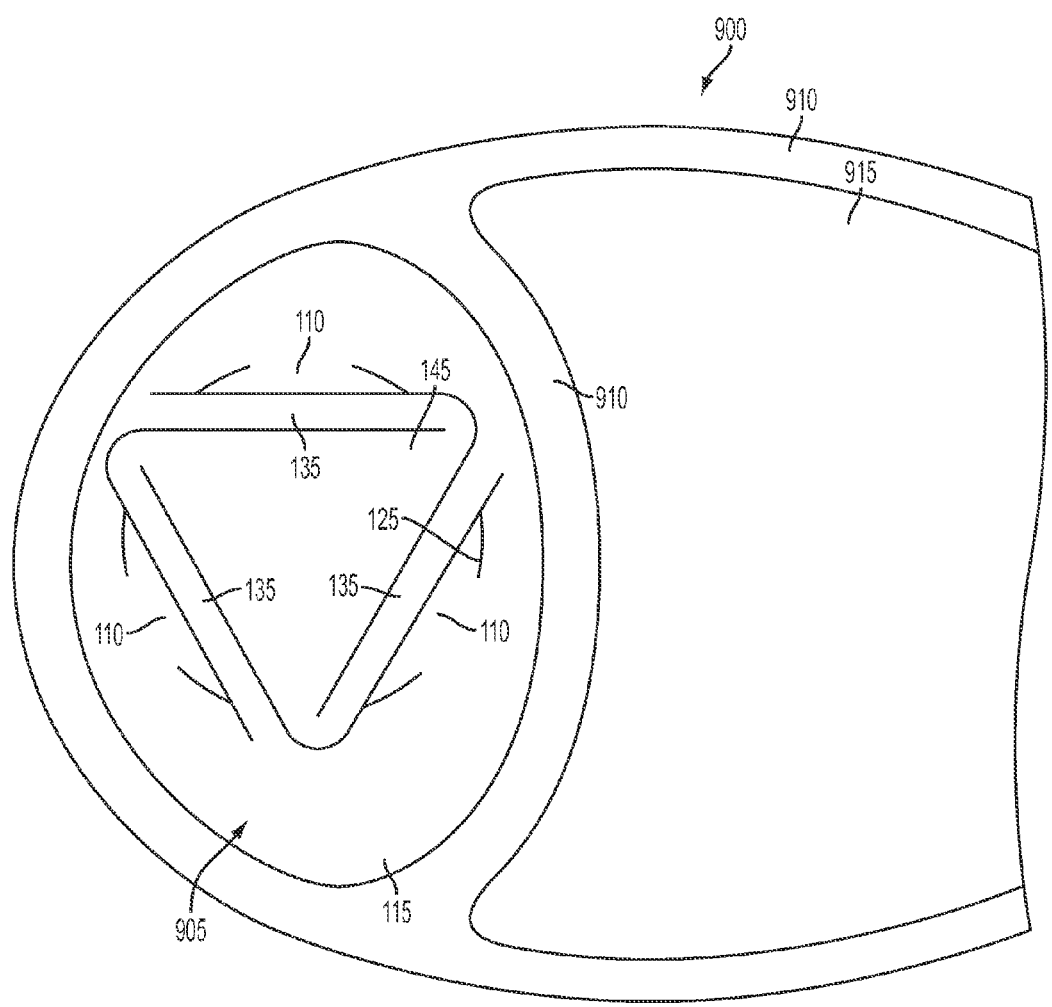
FIG. 9 is an illustration depicting one example of a portion of the apparatus in an undeployed state, according to an illustrative implementation.

FIG. 9 depicts an example portion of the apparatus 100 in an undeployed state. The apparatus can be part of a plate 900 such as a paper plate. The apparatus 100 can be disposed in a first compartment 905 of the plate 900. At least one lip 910 can separate the first compartment 905 from at least one second compartment 915. For example food can be placed in the second compartment 915, with the first compartment 905 reserved for the apparatus 100 that can hold the food or beverage container 200 in a deployed state. In the example of FIG. 9 (among others) at least some of the elements in the first compartment 905 (e.g., the lateral connector members 135 and parts of the inner perimeter 125) can be cut out or perforated along the indicated solid lines (e.g., the longitudinal edges 140) to detach from the rest of the plate 900 to form the opening for the beverage container 200. In some implementations, the lip 910 can include one or more slots or opening into which a utensil or napkin can be removably inserted.

Figure 10:
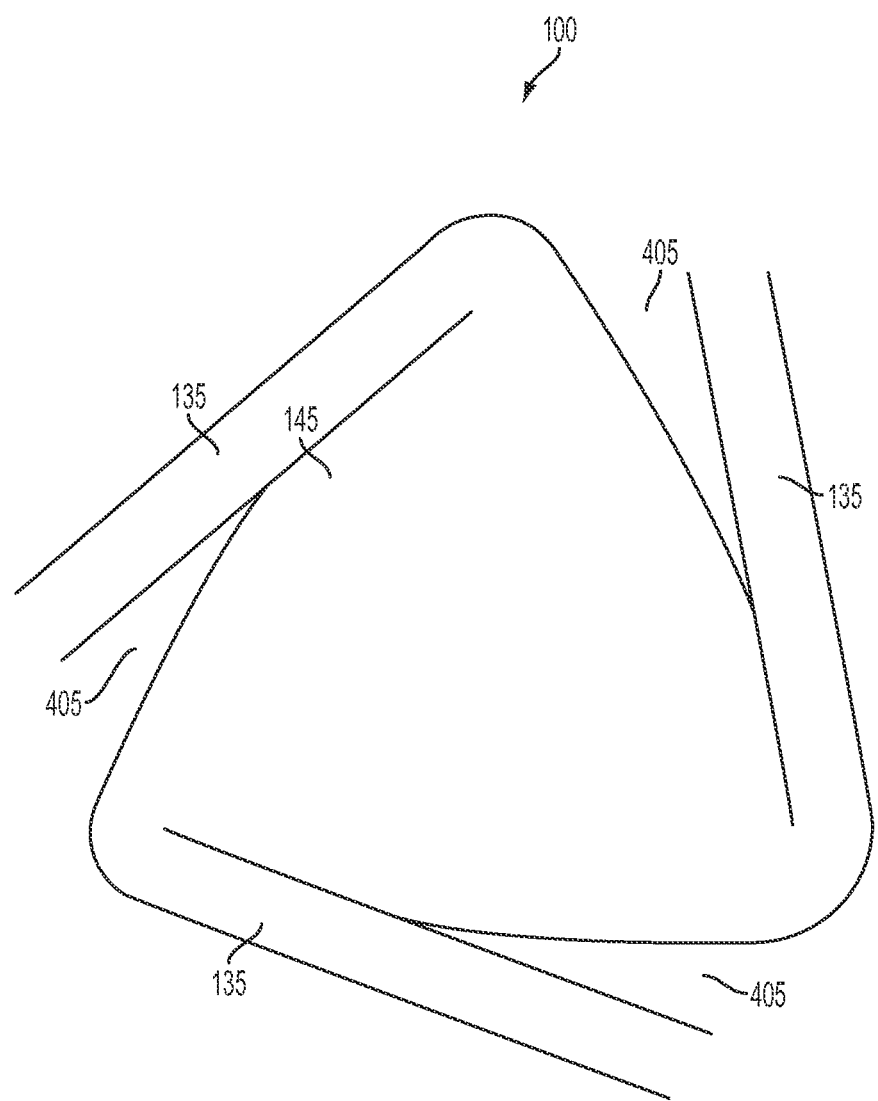
FIG. 10 is an illustration depicting one example of a portion of the apparatus in an undeployed state, according to an illustrative implementation.
Figure 11:
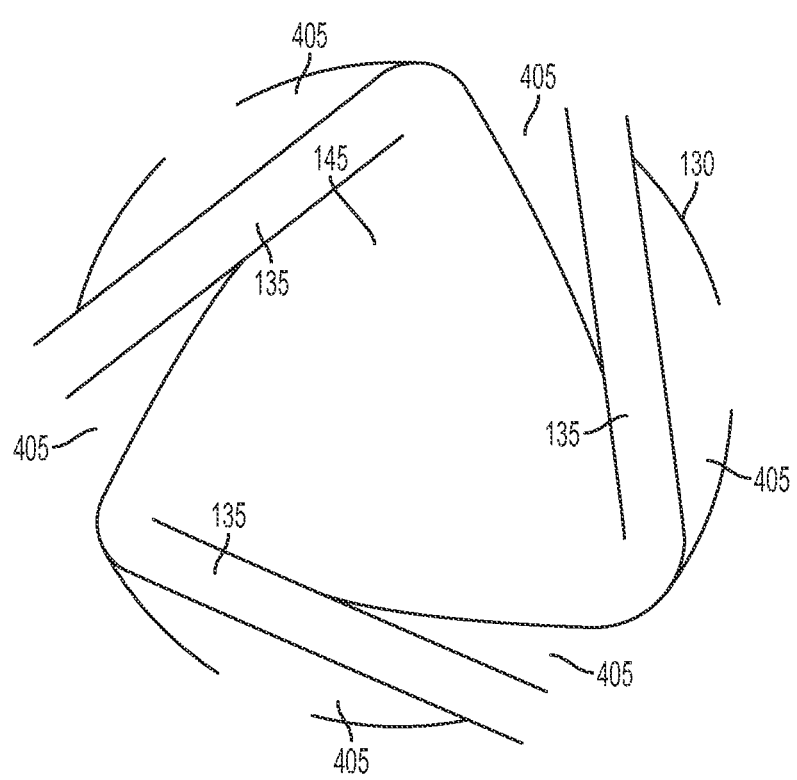
FIG. 11 is an illustration depicting one example of a portion of the apparatus in an undeployed state, according to an illustrative implementation.
Figure 12:
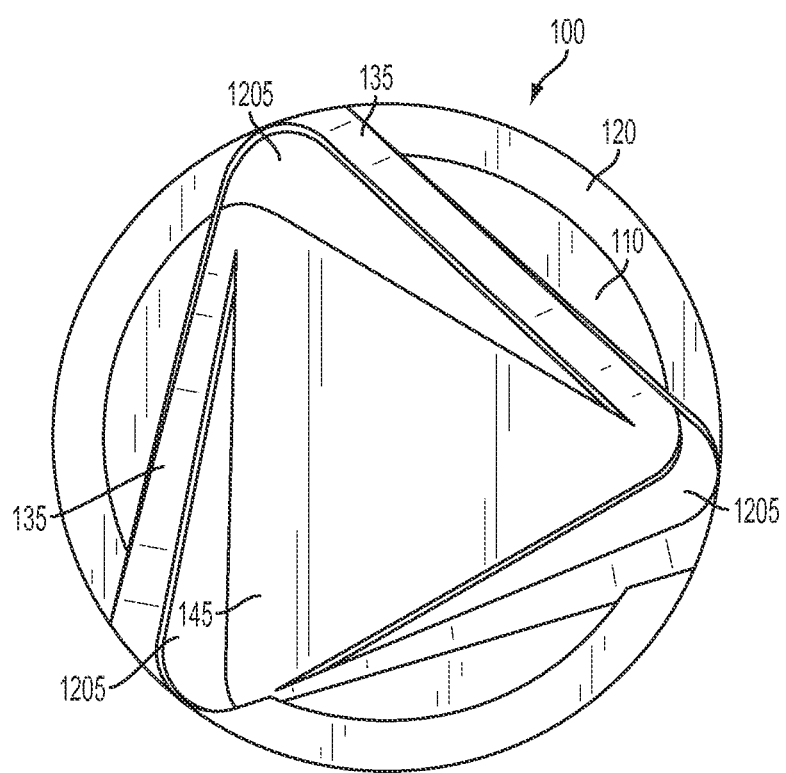
FIG. 12 is an illustration depicting one example of a portion of the apparatus in a partially deployed state, according to an illustrative implementation.
Figure 13:
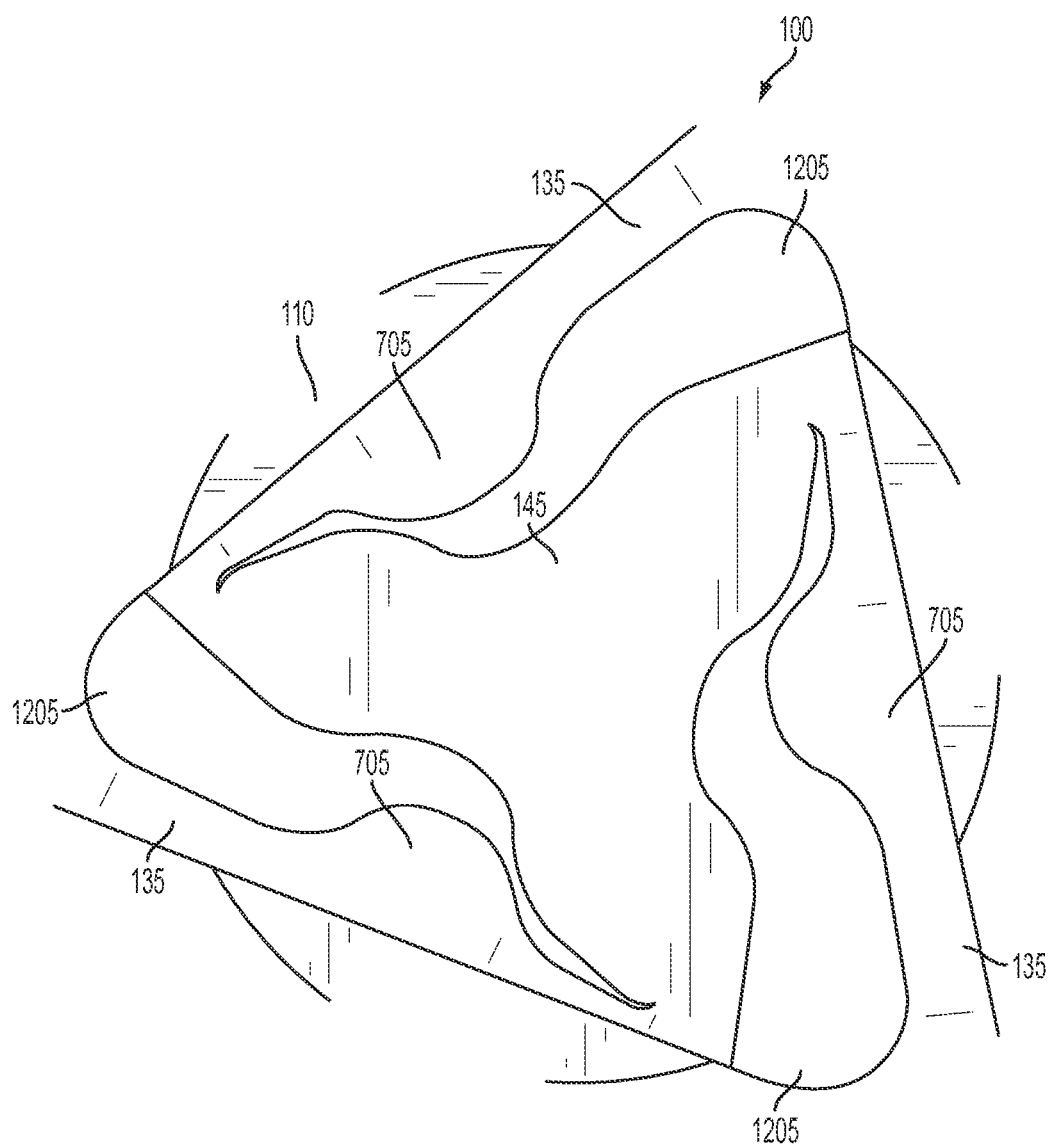
FIG. 13 is an illustration depicting one example of a portion of the apparatus in a partially deployed state, according to an illustrative implementation.

FIG. 10 and FIG. 11 depict examples of a portion of the apparatus 100 in an undeployed state, with the solid lines indicating cuts, incomplete cuts, or perforations that form the lateral connector members 135 and the tabs 405. The apparatus 100 can include a varying number of tabs 405. For example, the apparatus 100 can include three tabs 405, as in FIG. 10, or six tabs 405, as in FIG. 11. FIG. 12 and FIG. 13 depict examples of a portion of the apparatus 100 in a partially deployed state. For example, to transition from the undeployed to the deployed state, the lateral connector members 135 and the bottom support member 145 separate along their edges from the base body 105 (or from a plane defined by at least some of the base body 105 in an undeployed state) and begin to protrude downward from the bottom or underside of the plate (e.g., the plate 900). The separation forms at least one opening 1205 that forms the opening for the beverage container 200 when the apparatus 100 is in the deployed state. During transition from the undeployed state to the deployed state, the plane defining a majority of the bottom support member 145 can remain parallel (e.g., +/−10% of parallel) with a plane defined by at least part of the base body (e.g., the second portion 115). The lateral connector members 135 can protrude downward, or undergo angular displacement during the transition between states. The lateral connector members 135 may or may not include at least one fin 705.

Referring to FIG. 11, among others, the apparatus 100 can be manufactured by identifying an inner circle on the base body 105 having a diameter of 2.625 inches (e.g., +1-10%), and inscribing or identifying the corners of an equilateral triangle along the circumference of the circle. The straight sides of the equilateral triangle (longitudinal edges 140) can be arranged (e.g., as perforations) in a clockwise or counter clockwise manner and can extend no more than 0.25 inches inside the circle's perimeter. In this example, another line can be arranged in parallel to the outside of each of the (first) three longitudinal edges 140, e.g., as perforations, to form second longitudinal edges 140 of the lateral connector members 135. The second longitudinal edges 140 can be tangential to the inner circle. An outer circle (e.g., inner perimeter 125 of the boundary region 120) can be identified, concentric to the inner circle and having a diameter of, for example, 3.125 inches. The boundary region 120 can include the area between the inner perimeter 125 (e.g. the outer circle) and the outer perimeter 130 (e.g. the unmarked circle created by connecting the ends of the outer edges of the lateral connector members 135). The longitudinal edges 140 can be connected (e.g., as perforations) as indicated in FIG. 11 to form the tabs 405 in the deployed state.

Figure 14:
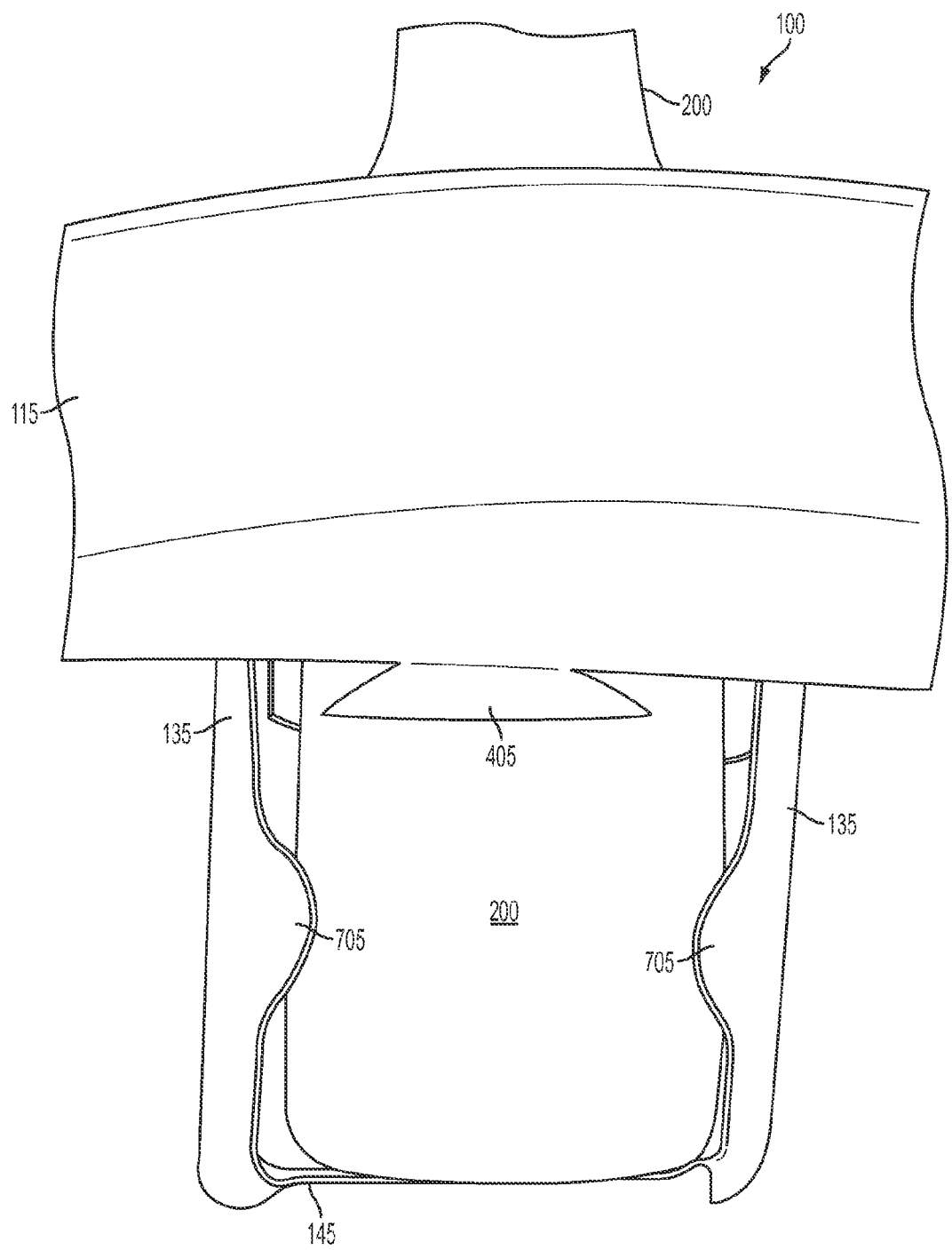
FIG. 14 is an illustration depicting one example of a portion of the apparatus in a deployed state, according to an illustrative implementation.

FIG. 14 depicts an example of the apparatus 100 in the deployed state with a beverage container 200 disposed therein. The bottom support member 145 can support a bottom of the beverage container 200. The lateral connector members 135, one or more fins 705 thereof, or one or more tabs 405 can contact lateral portions of the beverage container 200 to support the beverage container 200 or to hold the beverage container 200 in a substantially fixed position.

Figure 15:
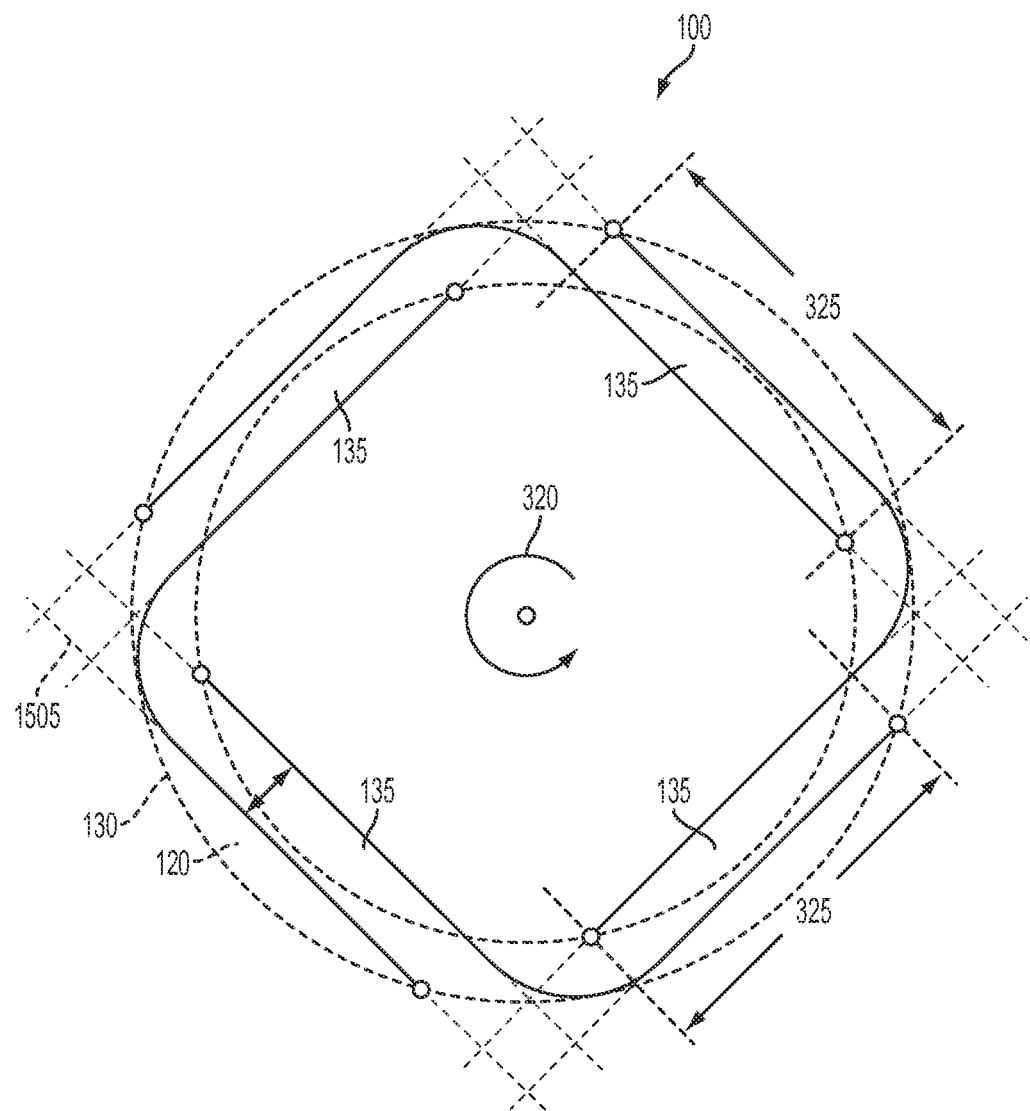
FIG. 15 is an illustration depicting one example of a portion of the apparatus in an undeployed state, according to an illustrative implementation.

FIG. 15 depicts an example of the apparatus 100 having four lateral connector members 135. In the undeployed state, as in the example of FIG. 15, the four lateral connector members are disposed in a square footprint 1505 of the base body 105. For example, four lateral connector members 135 can each be formed from at least part of the first portion 110 of the base body in a square configuration within the square footprint 1505 in the undeployed state. At least one end of each of the four lateral connector members 135 can be located or disposed at a vertex of the square, or an intersection of two sides of the square. The number of lateral connector members 135 can vary. For example, there can be two, three, four, or more than two lateral connector members 135. In some implementations, the lateral connector members 135 can each be formed from at least part of the first portion 110 of the base body and arranged as a regular polygon in an undeployed state. At least one end of each of the four lateral connector members 135 can be located or disposed at a vertex of the regular polygon, e.g., a triangle or square.

Figure 16:
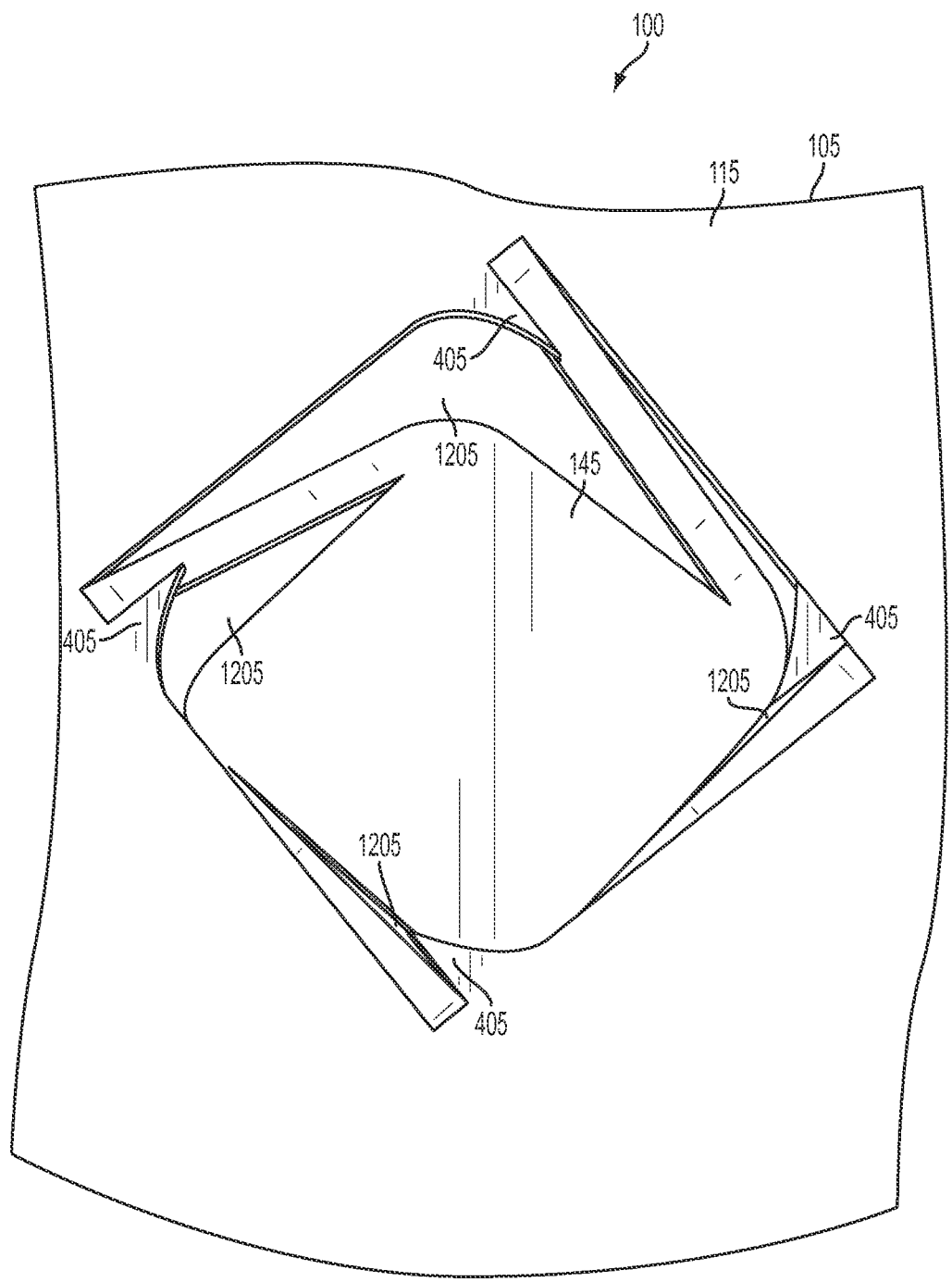
FIG. 16 is an illustration depicting one example of a portion of the apparatus in a partially deployed state, according to an illustrative implementation.
Figure 17:
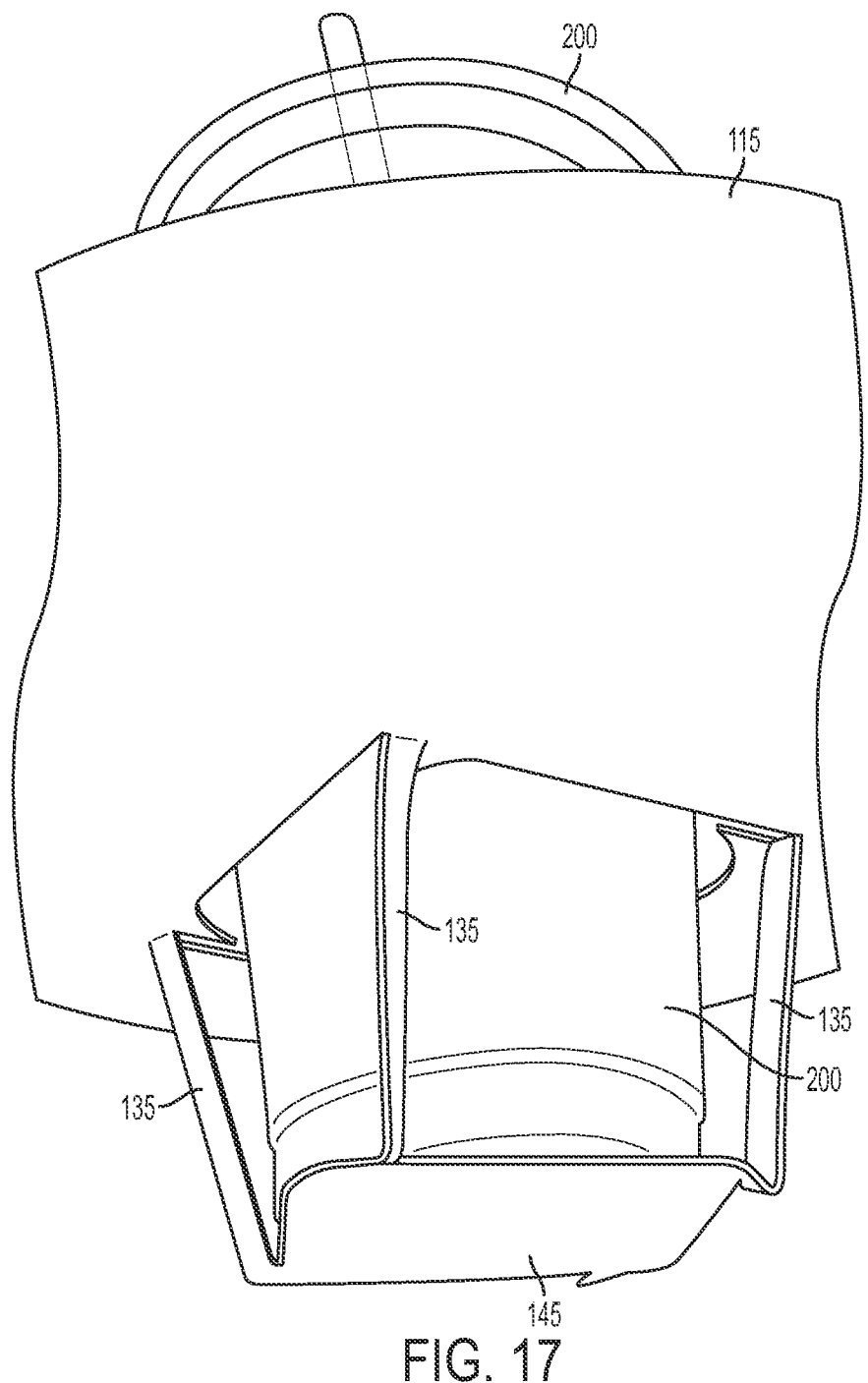
FIG. 17 is an illustration depicting one example of a portion of the apparatus in a deployed state, according to an illustrative implementation.

FIG. 16 depicts an example of the apparatus 100 in a partially deployed state. For example, the four (or other number) of lateral connector members 135 can pitch angularly downward while the bottom support member 145 undergoes vertical translation and planar rotation relative to at least part of the second portion 115 of the base body 105 during transition from the undeployed state to the deployed state. FIG. 17 depicts an example of the apparatus 100 in a deployed state with the beverage container 200 (e.g., a cup) removably disposed in the apparatus 100.

Figure 18:
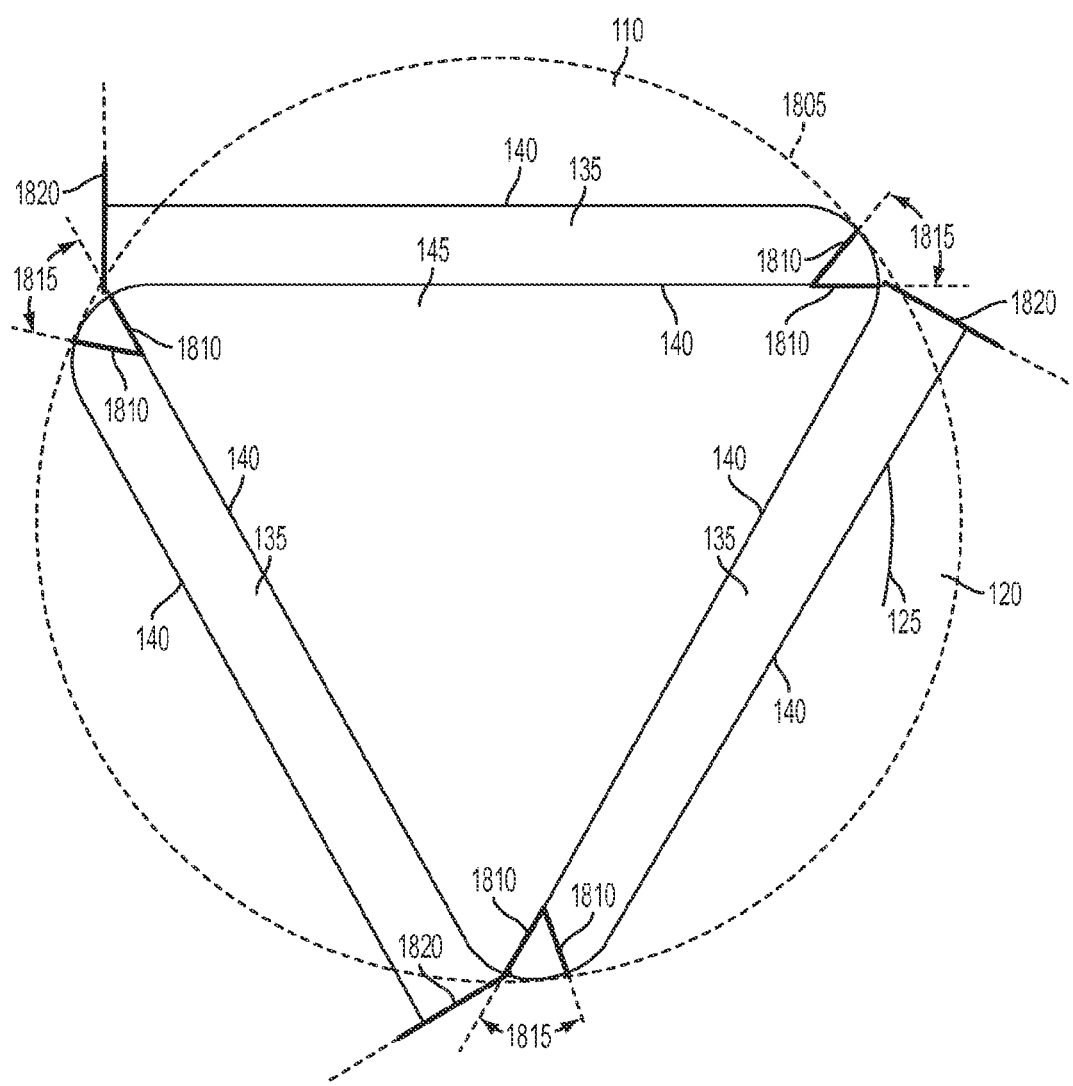
FIG. 18 is an illustration depicting one example of a portion of the apparatus in an undeployed state, according to an illustrative implementation.
Figure 19:
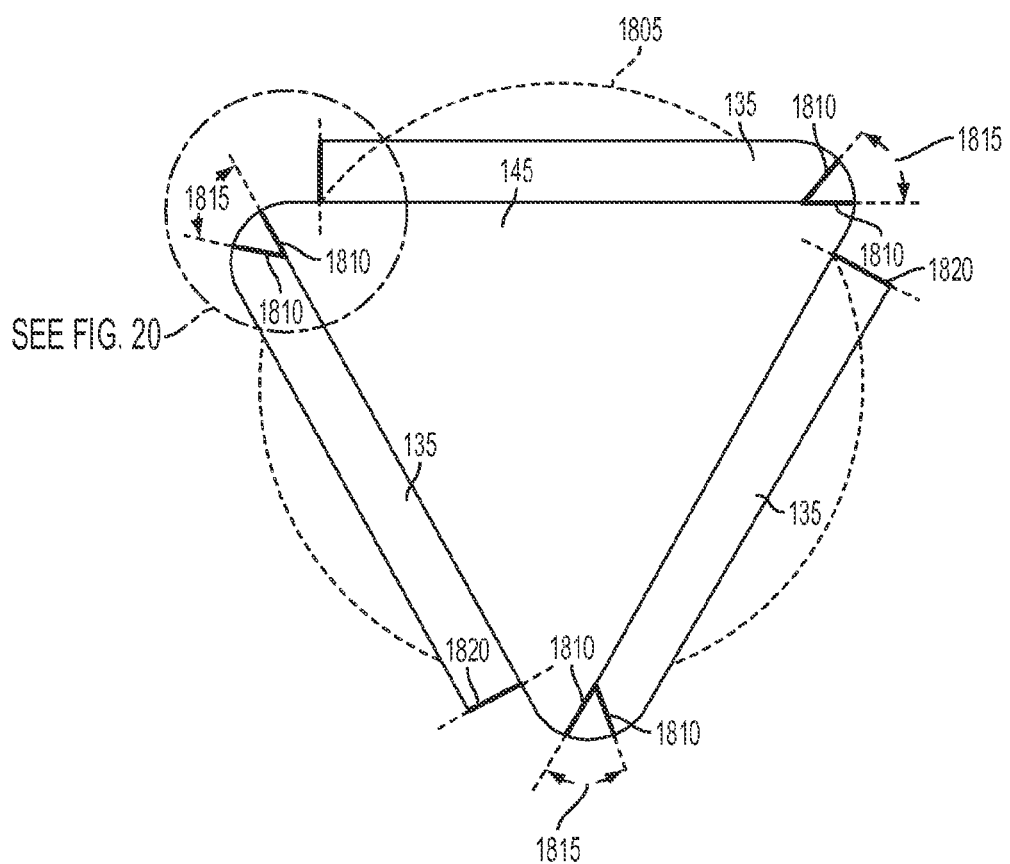
FIG. 19 is an illustration depicting one example of a portion of the apparatus in an undeployed state, according to an illustrative implementation.
Figure 20:
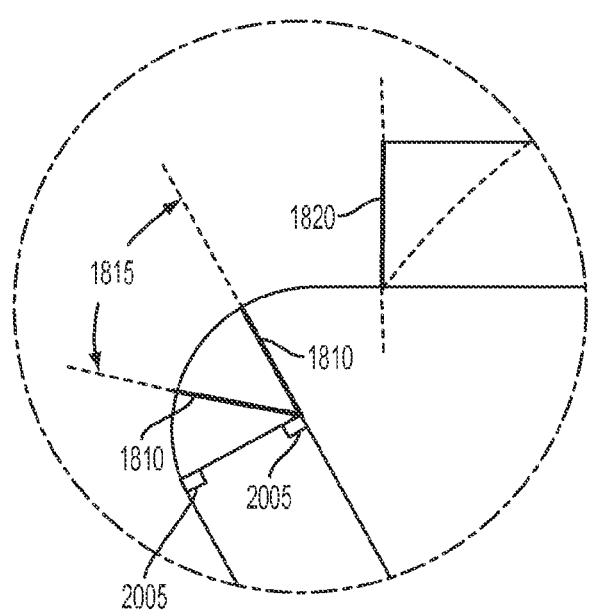
FIG. 20 is an illustration depicting one example of a portion of the apparatus of FIG. 19 in an undeployed state, according to an illustrative implementation.
Figure 21:
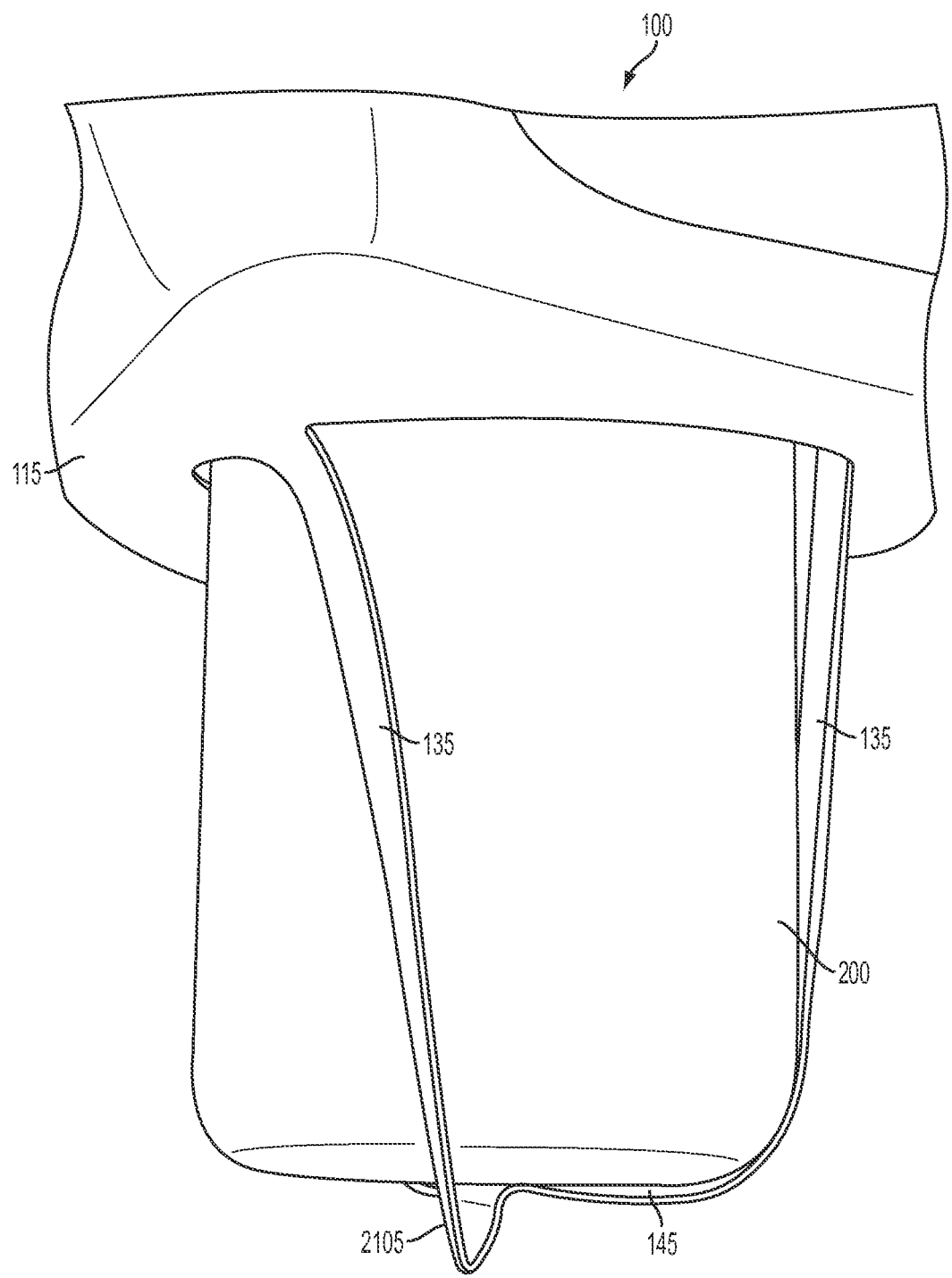
FIG. 21 is an illustration depicting one example of a portion of the apparatus in a deployed state, according to an illustrative implementation.

FIG. 18, FIG. 19, and FIG. 20 depict examples of a portion of the apparatus 100 in the undeployed state. FIG. 21 depicts an example of a portion of the apparatus 100 in a deployed state supporting a beverage container 200. The dimensions of the apparatus 100 can vary. For example, beginning and end points to cut or perforate the longitudinal edges 140 can be roughly aligned along the boundary of the circle 1805 having a diameter of substantially (e.g., +/−10%) 3.125 inches. In some implementations, the boundary of the circle 1805 (or the outer perimeter 130 or the inner perimeter 125) is an outer diameter of the beverage 200, +/−0.5 inches. The circle 1805 can be the outer perimeter 130 of the boundary region 120. The diameter can also be, for example, 2.675 inches (e.g., +/−0.5 inches), for placement of the beverage container 200 that is, for example, a can having a 2.675 inch diameter. In one implementation, and referring to FIGS. 1-3 and 18, among others, the diameter of the inner perimeter can be 2.675 inches (e.g., +/−10%) and the diameter of the outer perimeter 130 can be 3.125 inches (e.g., +/−10%). In some implementations, the diameter of the opening into which the beverage container 200 is inserted is less than 105% of the diameter of the beverage container 200.

The joints, or connection points between the lateral connector members 135 and the base body 105 or the bottom support member 145, can support for example three rotational degrees of freedom. In some implementations, at least one crease line can be formed from the material of the base body 105 in the undeployed state, to minimize stress on the lateral connector members 135 during deployment. The fold lines can include scoring or indenting to induce a fold along a natural fold line. In some implementations, a pinpoint hole 2005 can be formed at the first ends 310 or the second ends 315 of the lateral connector members 135 to, for example, distribute or relieve stress forces.

For example, the lateral connector members 135 can have two crease lines 1810 formed at an angle 1815 of, for example, 45 degrees (+/−10%). An end of the lateral connector members 135 can have a crease line 1820. The crease lines 1810, 1820 include indentations or scoring, and can facilitate folding along natural fold lines that form during transition from the undeployed state to the deployed state. For example, for each pair of crease lines 1810, one can fold up and the other can fold down, and the crease line 1820 can fold up. Referring to FIG. 21, among others, the crease lines 1810, 1820, can contribute to or cause at least one bracket and shelf formation 2105 in the deployed state, supporting compressive forces and increasing strength while limiting shearing or other forces that may cause a structural failure. This formation 2105 can support the bottom support member 145 as a bracket supports a shelf. Referring to the example of FIG. 21, although the bracket and shelf formation 2105 is depicted with reference to a single lateral connector member 135, multiple lateral connector members 135 can each include a bracket and shelf formation 2105.

Figure 22:
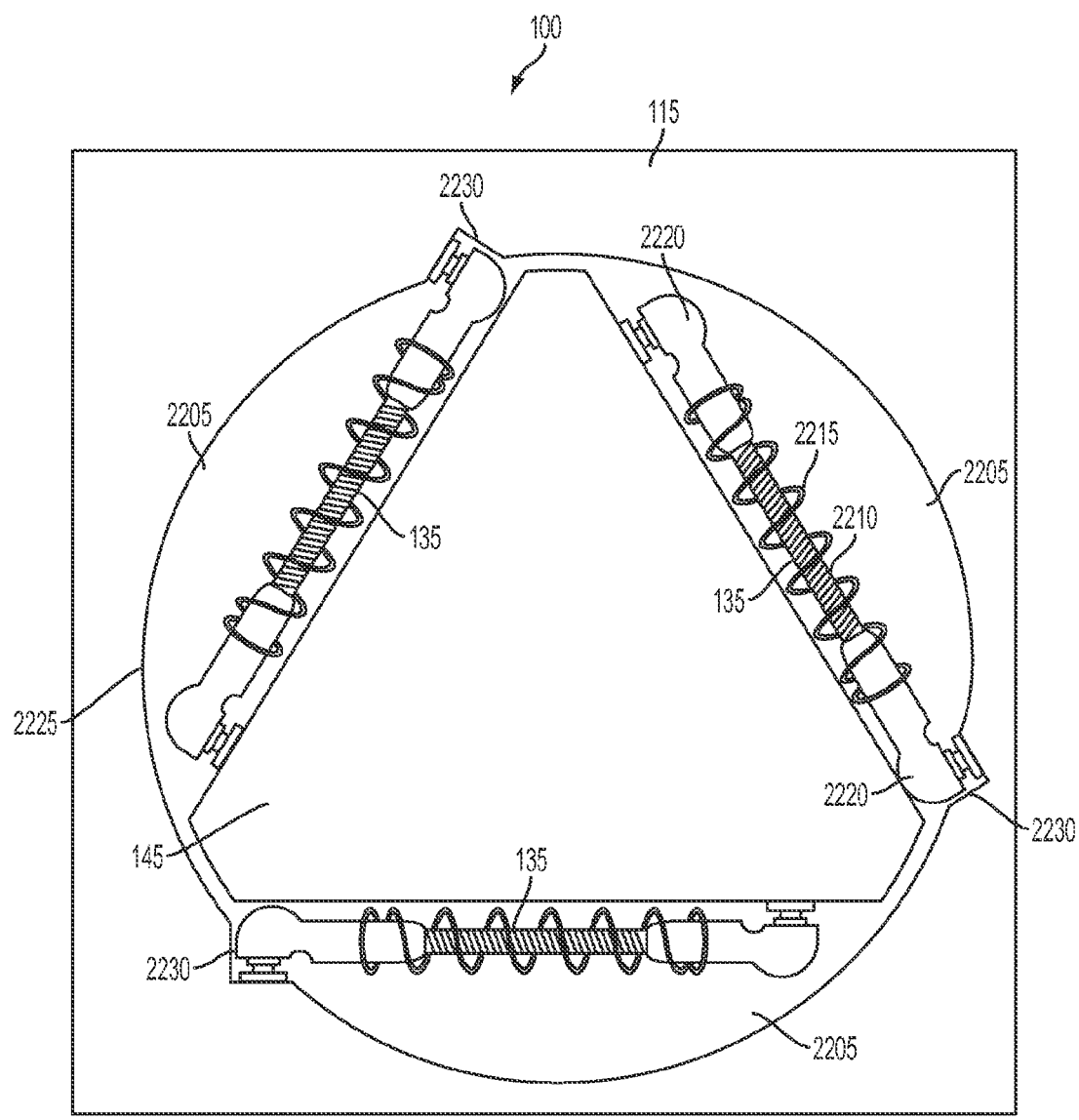
FIG. 22 is an illustration depicting one example of a portion of the apparatus in an undeployed state, according to an illustrative implementation.
Figure 23:
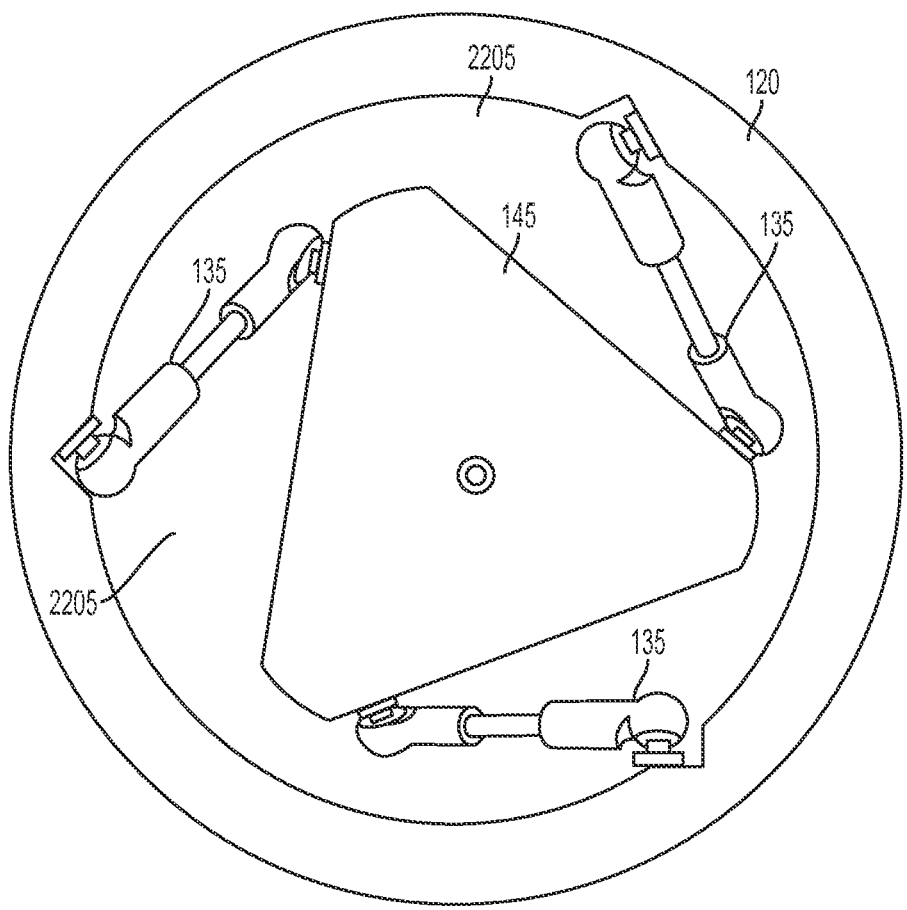
FIG. 23 is an illustration depicting one example of a portion of the apparatus in a partially deployed state, according to an illustrative implementation.
Figure 24:
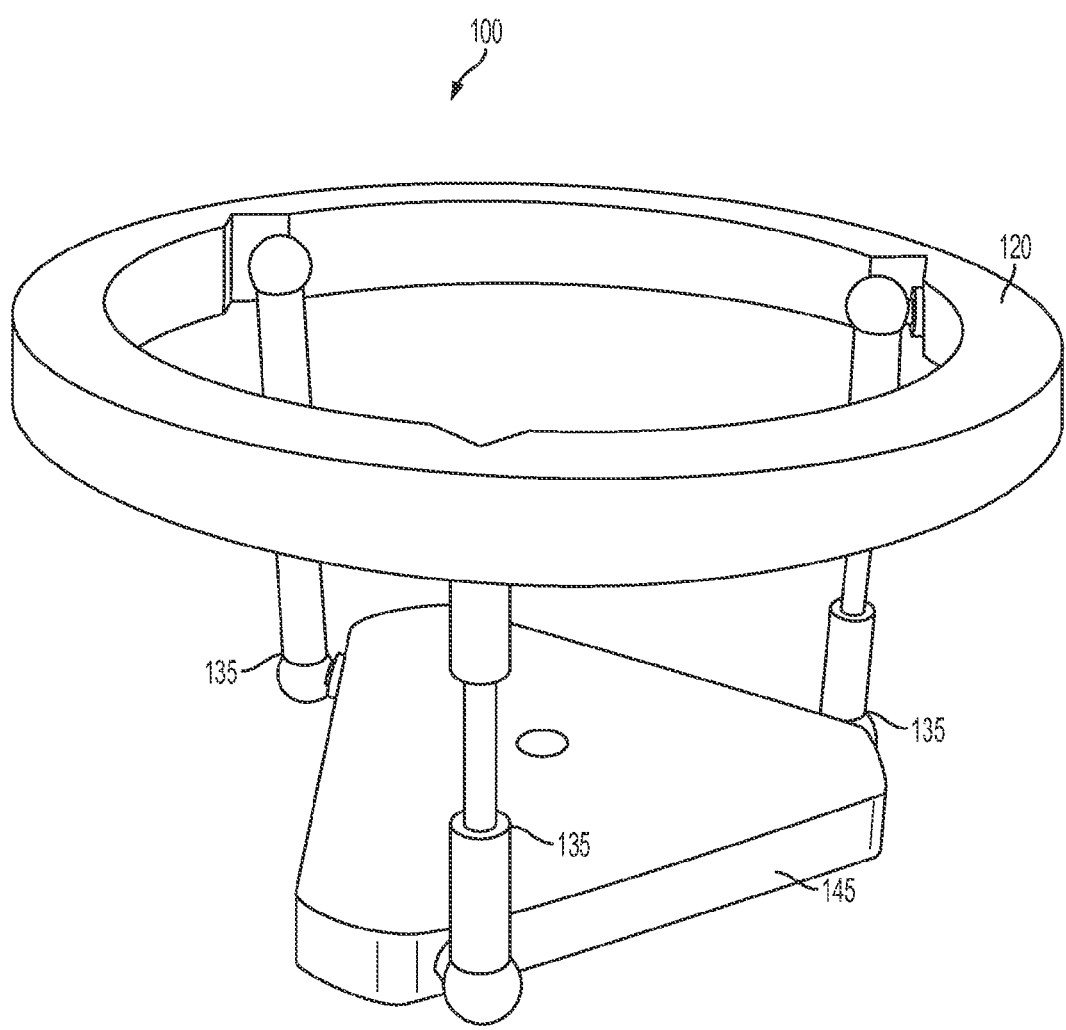
FIG. 24 is an illustration depicting one example of a portion of the apparatus in a deployed state, according to an illustrative implementation.
Figure 25:
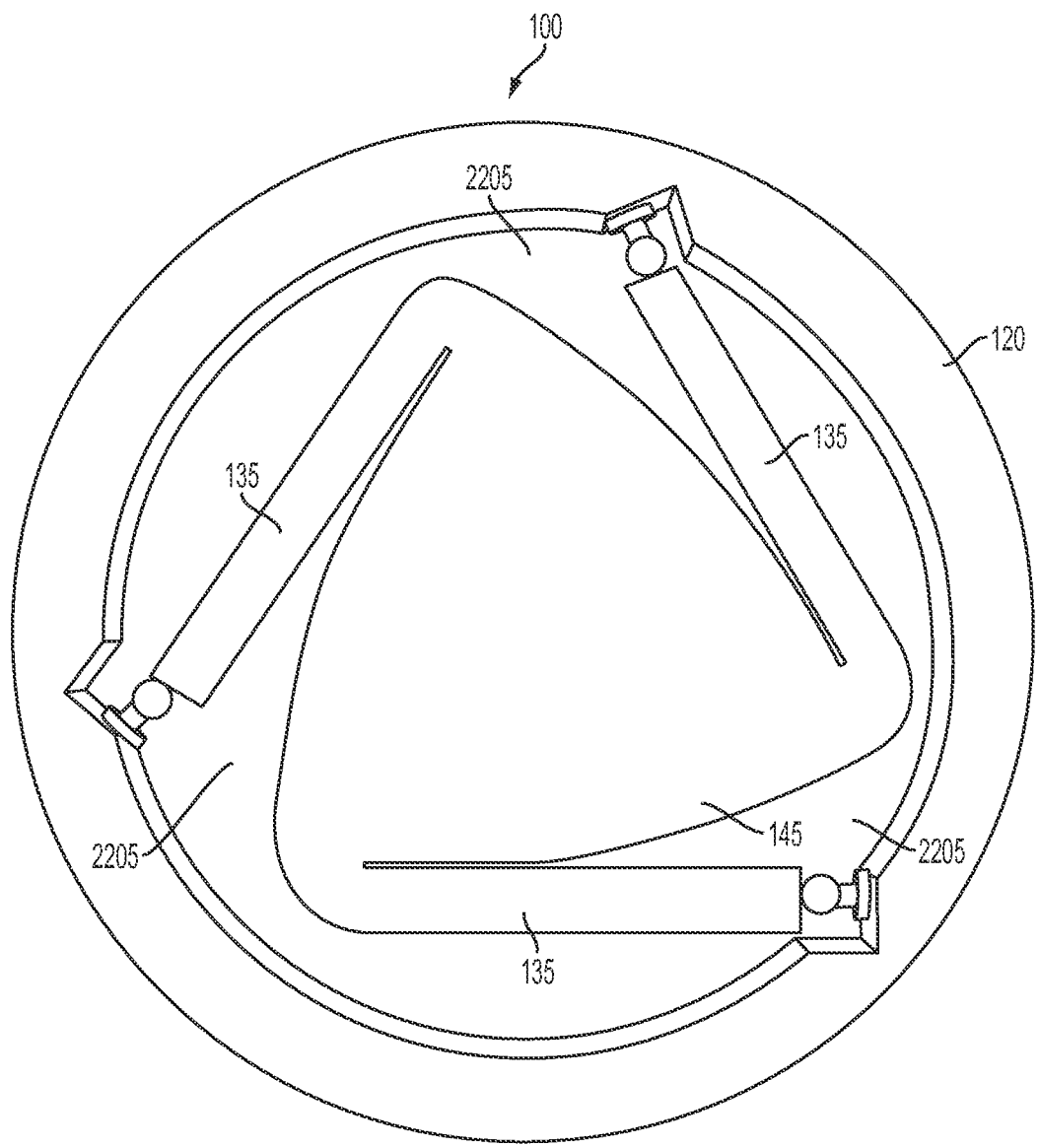
FIG. 25 is an illustration depicting one example of a portion of the apparatus in an undeployed state, according to an illustrative implementation.

FIG. 22 depicts a portion of the apparatus 100 in an undeployed state. FIG. 23 depicts a portion of the apparatus 100 in a partially deployed state. FIG. 24 depicts a portion of the apparatus in a deployed state. FIG. 25 depicts a portion of the apparatus 100 in an undeployed state. In some implementations, rather than be part of or formed from material of a plate (e.g., the plate 900), the apparatus 100 can be part of a fixed structure or formed from separate components that may or may not be integral pieces of the fixed structure. For example, apparatus 100 can be rigid, part of, or incorporated into a fixed structure such as a table, armchair, sofa, food serving tray, airline seatback tray, pop-out drink holder, patio furniture, pool furniture, beach chairs, car doors or consoles, e.g., the fixed structures can include at least part of the second portion 115.

Rather than be formed from a plate, in some implementations the apparatus 100 and components thereof such as the lateral connector members 135 can be metal or plastic pieces, with a first end fixed to the second portion 115 of the apparatus 100 and a second end fixed to the bottom support member 145. The lateral connector members 135 can connect to the second portion 115 or to the boundary region 120 of the base body 105, with open space 2205 (e.g., rather than tabs) between lateral connector members 135 and the second portion 115. During transition between undeployed and deployed states, the lateral connector members 135 can pivot or rotate. In some implementations, the apparatus 100 is a standalone apparatus, e.g., as in the example of FIG. 24, which can be separately manufactured as a standalone apparatus and inserted or connected to a fixed structure post-manufacturing.

The lateral connector members 135 can include at least one rod 2210 (as in FIG. 22, among others) such as a 3 mm diameter rod made from brass or other generally rigid material. The rod 2210 can be coupled to at least one spring 2215, for example having a 5/16 inch diameter and, for example, a length of 1.25 inches. Each end of the rod 2210 can connect to a ball joint 2220 having three rotational degrees of freedom and that can connect to the second portion 115 along a general circle 2225 having, for example, a 4 inch diameter. The ball joint 2220 can be 4 mm ball with 3 mm internal threading to accommodate the rod 2210, for example. Torsion forces applied to the springs 2215 can cause the apparatus 100 to retract over gravitational forces to the undeployed state.

A rigid apparatus 100 can be manufactured, for example, by forming or cutting the circle 2225 from a high density ⅜ inch (or other dimension) thick plastic sheet. The bottom support member 145 can be cut from the cutout circle with the remaining pieces discarded. Notches 2230 can be formed with holes drilled or formed into the notches to accommodate ball joint studs of the ball joint 2220. For example, the ball joints 2220 that connect to the second portion 115 can be tightly fit to the rod 2210, with the ball joints 2220 that connect to the bottom support member 145 free to rotate about threading of the rod 2220. The lateral connector members 135 can be pre-stressed by rotating the area of the ball joints 2220 that connect to the second portion 115, e.g., counter clockwise before securing the spring 2215 to the ball joint 2220. The pre-stressing can hold the bottom support member 145 in place against its own weight in the undeployed state, with the amount of (e.g., counterclockwise) rotation being a function of the weight of the bottom support member 145, the weight of the lateral connector members 135, and the properties of the spring 2215. With the appropriate amount of pre-stress in place, the ends of the spring 2215 can be clamped or otherwise secured against movement relative to both ball joints 2220 of a lateral connector member 135. The ball joints 2220 can be press-fit together.

Figure 26:
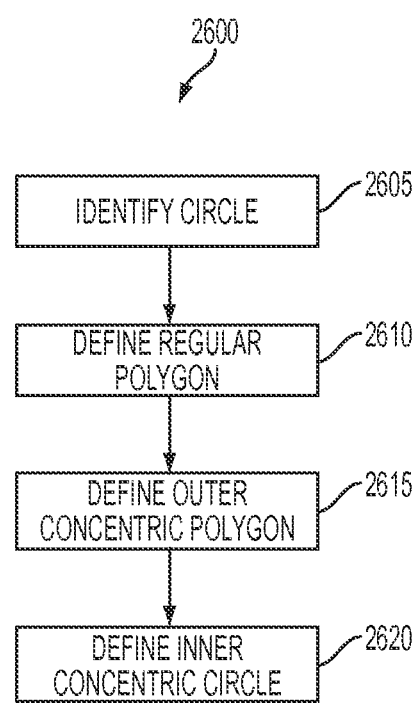
FIG. 26 is a flow diagram illustrating a method of manufacturing a beverage container support apparatus, according to an illustrative implementation.

FIG. 26 depicts a flow diagram illustrating a method 2600 of manufacturing the beverage container support apparatus 100. The method 2600 can include an act of defining an outer circle on the base body 105 (ACT 2605). The outer circle can have, for example, a diameter of 3.125 inches, (e.g., the outer perimeter 130). The identified outer circle may or may not be physically marked on the base body 105. For example, in an automated manufacturing environment, a manufacturing machine can define or virtually mark the outer circle (ACT 2605) by identifying coordinate points of the base body 105.

The method 2605 can include an act of defining an inner, typically regular, polygon (ACT 2610) generally inscribed or placed symmetrically within the defined outer circle. Members of the inner polygon (e.g., a rectangle as in FIG. 1, an equilateral triangle as in FIG. 3, or a square as in FIG. 15, among others) can form at least in part a first longitudinal length of each respective lateral connector members 135. The method 2605 can include an act of defining an outer, typically regular, polygon (ACT 2615). In some implementations, the outer polygon is concentric with the inner polygon (or the outer and inner polygons form at least part of a footprint of a two dimensional polygon). The outer polygon can form at least in part a second longitudinal length of each respective lateral connector members 135. The inner and outer polygons may not be physically marked on the base body 105. For example, in an automated manufacturing environment, a manufacturing machine can define or virtually mark the inner (ACT 2610) and outer (ACT 2615) polygons by identifying coordinate points of the base body 105. At least portions of the inner and outer polygons can be slit, cut, or perforated (e.g., during manufacturing) so that they can separate from the base body 105 to deploy into the deployed state and form the opening for the beverage container 200.

The method 2600 can include an act of defining an inner concentric circle on the base body 105 (ACT 2620). The inner circle can have, for example, a diameter of between 2.675 inches and 3.00 inches, (e.g., the inner perimeter 125). The identified inner circle may or may not be physically marked on the base body 105. For example, in an automated manufacturing environment, a manufacturing machine can define the inner circle (ACT 2620) by identifying coordinate points of the base body 105. The first ends 310 of the lateral connector members 135 can be located at the outer circle, and the second ends 315 of the lateral connector members can be located at the inner circle. The identifying or defining acts (e.g., ACTS 2605, 2610, 2615, 2620) of the method 2600 can include marking, cutting, inscribing, identifying, perforating, forming, or stamping the elements of the apparatus 100, such as the lateral connector members 135, the tabs, 405, or the bottom support member 145. A method can also include providing the apparatus 100.

Features that are described herein in the context of separate implementations can also be implemented in combination in a single embodiment or implementation. Features that are described in the context of a single implementation can also be implemented in multiple implementations separately or in various sub-combinations. Moreover, although features may be described above as acting in certain combinations and even initially claimed as such, one or more features from a claimed combination can in some cases be excised from the combination, and the claimed combination may be directed to a sub combination or variation of a sub combination.

Similarly, acts depicted in the drawings or described do not require performance in the particular order shown or in sequential order, and all illustrated or described acts need not be performed. Actions recited in the claims can be performed in a different order. Any method or processes depicted in the figures need not require the particular order shown, or sequential order, to achieve desirable results.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, perforated features can be partially cut. Further, while not labeled in every Figure for clarity and ease of description, elements present and labeled in one Figure may be present and unlabeled in other Figures. Further, the apparatus 100 can include exactly two, exactly three, or exactly four lateral connector members 135, or another number of lateral connector members 135. The apparatus 100 can be a low profile apparatus in the undeployed state. For example when part of a plate, the undeployed apparatus 100 can have the same thickness profile as the second portion 115 of the base body 105 of the plate. Further, the apparatus 100 can repeatedly change state, e.g., from undeployed to deployed, and back to undeployed. Further, the first and second lateral connector members 135 can span both the interior of the boundary region and interior of the projection of the base of an intended container in the undeployed state while then spanning exterior of a placed container in a deployed state. Tabs can be formed from the boundary region and can move from a first position in the undeployed state to a second position in a deployed state to accommodate many different container shapes and diameters and apply a contact force to stabilize and center the container.

The foregoing implementations are illustrative rather than limiting of the described systems and methods. For example, the measurements herein given (e.g., in inches, ounces, or millimeters) can be the precise numbers identified (e.g., +/−1%) or substantially the numbers identified (e.g., +/−10%). Scope of the systems and methods described herein is thus indicated by the appended claims, rather than the foregoing description, and changes that come within the meaning and range of equivalency of the claims are embraced therein.

What is claimed is:

1. A beverage container support apparatus, comprising:
   a base body having a first portion, a second portion, and a boundary region between the first portion and the second portion, the boundary region having an inner perimeter proximate to the first portion and an outer perimeter proximate to the second portion;
   a first straight lateral connector member, a majority of the first straight lateral connector member formed from the first portion of the base body and not from the boundary region;
   a second straight lateral connector member, a majority of the second straight lateral connector member formed from the first portion of the base body and not from the boundary region, the first straight lateral connector member and the second straight lateral connector member having a same length;
   a bottom support member formed at least in part from the first portion of the base body;
   the first straight lateral connector member, the second straight lateral connector member, and the bottom support member disposed in a coplanar position with both the first portion of the base body and with the second portion of the base body in an undeployed state;
   the first straight lateral connector member connecting the bottom support member with the second portion of the base body in the undeployed state and in a deployed state;
   the second straight lateral connector member connecting the bottom support member with the second portion of the base body in the undeployed state and in the deployed state;
   the first straight lateral connector member, the second straight lateral connector member, and the bottom support member configured for simultaneous vertical translation and planar rotation of the bottom support member relative to the second portion of the base body during transition from the undeployed state to the deployed state; and
   the bottom support member configured to maintain a parallel orientation relative to the second portion of the base body during transition from the undeployed state to the deployed state.

2. The apparatus of claim 1, comprising:
   the first portion of the base body configured to move from a first position in the undeployed state to a second position in the deployed state.

3. The apparatus of claim 1, comprising:
the first portion of the base body configured to apply a contact force to a beverage container in the deployed state.

4. The apparatus of claim 1, comprising:
the boundary region at least partially defining an opening in the deployed state.

5. The apparatus of claim 1, wherein the base body includes at least part of a plate, with the first portion of the base body configured to support a beverage container in the deployed state and the second portion of the base body configured to support food.

6. The apparatus of claim 1, comprising:
a third lateral connector member formed from at least part of the first portion of the base body and having the same length as the first straight lateral connector member and the second straight lateral connector member; and
the third lateral connector member configured to pitch angularly in conjunction with simultaneous vertical translation and planar rotation of the bottom support member relative to the second portion of the base body during transition from the undeployed state to a deployed state.

7. The apparatus of claim 1, comprising:
a third lateral connector member formed from at least part of the first portion of the base body; and
the first straight lateral connector member, the second straight lateral connector member, and the third lateral connector member arranged as an equilateral triangle in the undeployed state.

8. The apparatus of claim 1, comprising:
a third lateral connector member, a majority of the third straight lateral connector member formed from the first portion of the base body and not from the boundary region and having the same length as the first straight lateral connector member and the second straight lateral connector member;
the first straight lateral connector member having a first end connecting the first straight lateral connector member with the second portion of the base body, and having a second end connecting the first straight lateral connector member with the bottom support member;
the second straight lateral connector member having a first end connecting the second straight lateral connector member with the second portion of the base body, and having a second end connecting the second straight lateral connector member with the bottom support member;
the third lateral connector member having a first end connecting the third lateral connector member with the second portion of the base body, and having a second end connecting the third lateral connector member with the bottom support member;
the first end of each of the first straight lateral connector member, the second straight lateral connector member, and the third lateral connector member disposed at a symmetric vertex of a first equilateral triangle; and
the second end of each of the first straight lateral connector member, the second straight lateral connector member, and the third lateral connector member disposed at a symmetric vertex of a second equilateral triangle, the second equilateral triangle concentric with the first equilateral triangle.

9. The apparatus of claim 1, comprising:
a third lateral connector member formed from at least part of the first portion of the base body;
a fourth lateral connector member formed from at least part of the first portion of the base body; and
the first straight lateral connector member, the second straight lateral connector member, the third lateral connector member, and the fourth lateral connector member arranged as a square in the undeployed state.

10. The apparatus of claim 9, comprising:
at least one end of each lateral connector member disposed at a vertex of the square.

11. The apparatus of claim 1, comprising:
at least one additional lateral connector member, a majority of the at least one additional straight lateral connector member formed from the first portion of the base body and not from the boundary region;
the first straight lateral connector member, the second straight lateral connector member, and the at least one additional lateral connector member arranged as a regular polygon in the undeployed state.

12. The apparatus of claim 1, comprising:
the first straight lateral connector member having a first end to connect the first straight lateral connector member with the second portion of the base body, and having a second end to connect the first straight lateral connector member with the bottom support member;
the second straight lateral connector member having a first end to connect the second straight lateral connector member with the second portion of the base body, and having a second end to connect the second straight lateral connector member with the bottom support member;
the first end of each of the first straight lateral connector member and the second straight lateral connector member supporting three or fewer rotational degrees of freedom.

13. The apparatus of claim 1, comprising:
the first straight lateral connector member, the second straight lateral connector member, and the bottom support member supporting a food or beverage container in the deployed state.

14. The apparatus of claim 1, comprising:
a lip defining a boundary between the first portion of the base body and the second portion of the base body.

15. The apparatus of claim 1, comprising:
the first straight lateral connector member and the second straight lateral connector member each having the same length of at least 1.5 inches.

16. The apparatus of claim 1, comprising:
the bottom support member disposed in the parallel orientation relative to the second portion of the base body in the deployed state.

17. The apparatus of claim 1, comprising:
at least one of the first straight lateral connector member and the second straight lateral connector member defining a fin.

18. The apparatus of claim 1, comprising:
the second portion of the base body defining an opening for insertion of at least one of a utensil and a napkin.

19. The apparatus of claim 1, comprising:
the first straight lateral connector member having a first end that connects the first straight lateral connector member with the second portion of the base body in the coplanar position with the first portion of the base body, and having a second end to connect the first straight lateral connector member with the bottom support member in the coplanar position with the first portion of the base body; and the second straight lateral connector member having a first end that connects the second straight lateral connector member with the second portion of the base body in the coplanar position with the first portion of the base body, and having a second end to connect the second straight lateral connector member with the bottom support member in the coplanar position with the first portion of the base body.

20. The apparatus of claim 1, comprising:
the first straight lateral connector member and the bottom support member arranged in a first bracket and shelf formation; and
the second straight lateral connector member and the bottom support member arranged in a second bracket and shelf formation.

* * * * *